(12) United States Patent
Nakamura

(10) Patent No.: US 9,471,459 B2
(45) Date of Patent: Oct. 18, 2016

(54) INFORMATION ACQUISITION METHOD AND INFORMATION ACQUISITION APPARATUS

(71) Applicant: FUJITSU LIMITED, Kawasaki-shi, Kanagawa (JP)

(72) Inventor: Tomohiro Nakamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/322,610

(22) Filed: Jul. 2, 2014

(65) Prior Publication Data
US 2015/0026699 A1 Jan. 22, 2015

(30) Foreign Application Priority Data

Jul. 18, 2013 (JP) ................. 2013-149565

(51) Int. Cl.
| | | |
|---|---|---|
| G06F 9/46 | (2006.01) | |
| G06F 11/34 | (2006.01) | |
| G06F 11/30 | (2006.01) | |
| G06F 11/32 | (2006.01) | |

(52) U.S. Cl.
CPC ....... G06F 11/3452 (2013.01); G06F 11/3003 (2013.01); G06F 11/3055 (2013.01); G06F 11/3419 (2013.01); G06F 11/3476 (2013.01); G06F 11/327 (2013.01); G06F 2201/86 (2013.01); G06F 2201/875 (2013.01)

(58) Field of Classification Search
None
See application file for complete search history.

(56) References Cited

U.S. PATENT DOCUMENTS

| | | | | |
|---|---|---|---|---|
| 4,791,570 A | * | 12/1988 | Sherman | G05D 1/0297 180/168 |
| 2009/0100430 A1 | * | 4/2009 | Valentin | G06F 9/4843 718/102 |
| 2011/0106577 A1 | | 5/2011 | Nakazato | |
| 2013/0247050 A1 | * | 9/2013 | Watanabe | G06F 9/46 718/101 |
| 2014/0208327 A1 | * | 7/2014 | Cadambi | G06F 9/5044 718/103 |

FOREIGN PATENT DOCUMENTS

| | | |
|---|---|---|
| JP | 11-138147 | 5/1999 |
| JP | 2006-171883 | 6/2006 |
| JP | 2006-302096 | 11/2006 |
| JP | 2008-033754 | 2/2008 |
| WO | 2010/004643 | 1/2010 |

* cited by examiner

Primary Examiner — Emerson Puente
Assistant Examiner — Steven Do
(74) Attorney, Agent, or Firm — Fujitsu Patent Center

(57) ABSTRACT

A storage unit stores information indicting the past execution records of a plurality of related tasks. An operating unit obtains information indicating the execution status of a plurality of tasks. After obtaining the information, the operating unit obtains the execution status of an unexecuted task included in the plurality of related tasks, which was not yet executed, at an estimated time by which the unexecuted task is completed and which is estimated based on the information stored in the storage unit.

11 Claims, 25 Drawing Sheets

| LOG TABLE ||||
| --- | --- | --- | --- |
| ID | TIMESTAMP | WORKER ID | EVENT NAME |
| 001 | 2013/04/15 10:00 | N1 | RECEIPT |
| 001 | 2013/04/15 11:00 | N2 | ORDER ACCEPTANCE |
| 001 | 2013/04/15 13:00 | N3 | CONFIRMATION OF DETAILS |
| 001 | 2013/04/15 16:00 | N4 | APPROVAL |
| ... | ... | ... | ... |
| 101 | 2013/04/19 10:00 | N1 | RECEIPT |
| ... | ... | ... | ... |
| 102 | 2013/04/19 10:40 | N5 | QUOTATION |
| ... | ... | ... | ... |
| 101 | 2013/04/19 11:00 | N2 | ORDER ACCEPTANCE |
| ... | ... | ... | ... |
| 101 | 2013/04/19 13:00 | N3 | CONFIRMATION OF DETAILS |
| ... | ... | ... | ... |

FIG. 5

| FLOW TYPE TABLE | 113 |
|---|---|
| FLOW TYPE ID | EVENT ID |
| F1 | E11 |
| | E12 |
| | E13 |
| | E14 |
| F2 | E21 |
| | E22 |
| | E23 |
| F3 | E31 |
| | E32 |
| | E33 |
| F4 | E41 |
| | E42 |
| ... | ... |

FIG. 7

| PROCESS MANAGEMENT TABLE | 114 |
|---|---|
| PROCESS ID | FLOW TYPE ID |
| 001 | F1 |
| 002 | F2 |
| 003 | F3 |
| ... | ... |
| 011 | F1 |
| ... | ... |
| 021 | F1 |
| ... | ... |
| 031 | F1 |
| ... | ... |
| 101 | F1 |
| 102 | F2 |
| 103 | F3 |
| ... | ... |

FIG. 8

| REFERENCE PARAMETER TABLE ||||
|---|---|---|---|
| FLOW TYPE ID | DETERMINATION REFERENCE VALUE | REFERENCE STANDARD DEVIATION ||
| | | EVENT INTERVAL RATIO | OPERATION INTERVAL |
| F1 | 3 | 0.03 | 2.5 |
| F2 | 5 | 0.25 | 2.0 |
| ... | ... | ... | ... |

| EVENT INTERVAL MANAGEMENT TABLE ||||| 116 |
|---|---|---|---|---|
| FLOW TYPE ID | PROCESS ID | INTERVAL #1 (E11~E12) | INTERVAL #2 (E12~E13) | INTERVAL #3 (E13~E14) |
| F1 | 001 | 1h | 2h | 3h |
| | 011 | 5h | 10h | 15h |
| | 021 | 3h | 8h | 10h |
| | 031 | 7h | 21h | 22h |
| | 101 | 1h | 2h | — |

FIG. 10

EVENT INTERVAL RATIO EVALUATION TABLE

| FLOW TYPE ID | SAMPLE COUNT | EVENT INTERVAL | MEAN OF EVENT INTERVAL RATIO | STANDARD DEVIATION OF EVENT INTERVAL RATIO | EXCEPTION RANGE | STATIONARITY PROPERTY |
|---|---|---|---|---|---|---|
| F1 | 3 | INTERVAL #1 (E11~E12) | 0.1588 | 0.01 | 0.1788 OR GREATER AND 0.1388 OR LESS | |
| | | INTERVAL #2 (E12~E13) | 0.3492 | 0.02 | 0.3892 OR GREATER AND 0.3092 OR LESS | EXIST |
| | | INTERVAL #3 (E13~E14) | 0.4920 | 0.01 | 0.5120 OR GREATER AND 0.4720 OR LESS | |

FIG. 11

| OPERATION INTERVAL MANAGEMENT TABLE ||||
|---|---|---|---|
| FLOW TYPE ID | PROCESS ID | TIMESTAMP | OPERATION INTERVAL |
| F1 | 001 | 2013/04/15 10:00 | — |
| | 011 | 2013/04/16 10:00 | 24h |
| | 021 | 2013/04/17 10:00 | 24h |
| | 031 | 2013/04/18 13:00 | 27h |
| | 101 | 2013/04/19 14:00 | 25h |

| OPERATION INTERVAL EVALUATION TABLE | | | | | |
|---|---|---|---|---|---|
| FLOW TYPE ID | SAMPLE COUNT | MEAN OF OPERATION INTERVAL | STANDARD DEVIATION OF OPERATION INTERVAL | EXCEPTION RANGE | STATION-ARITY PROPERTY |
| F1 | 3 | 25h | 1h | 27h OR GREATER AND 23h OR LESS | EXIST |

| COLLECTION TIME TABLE | | | | 121 |
|---|---|---|---|---|
| PROCESS ID | EVENT ID | LIMIT TIME | TARGETED COLLECTION TIME | |
| 101 | E14 | 2013/04/19 15:59 | 2013/04/19 16:13 | |
| ... | ... | ... | ... | |

FIG. 15

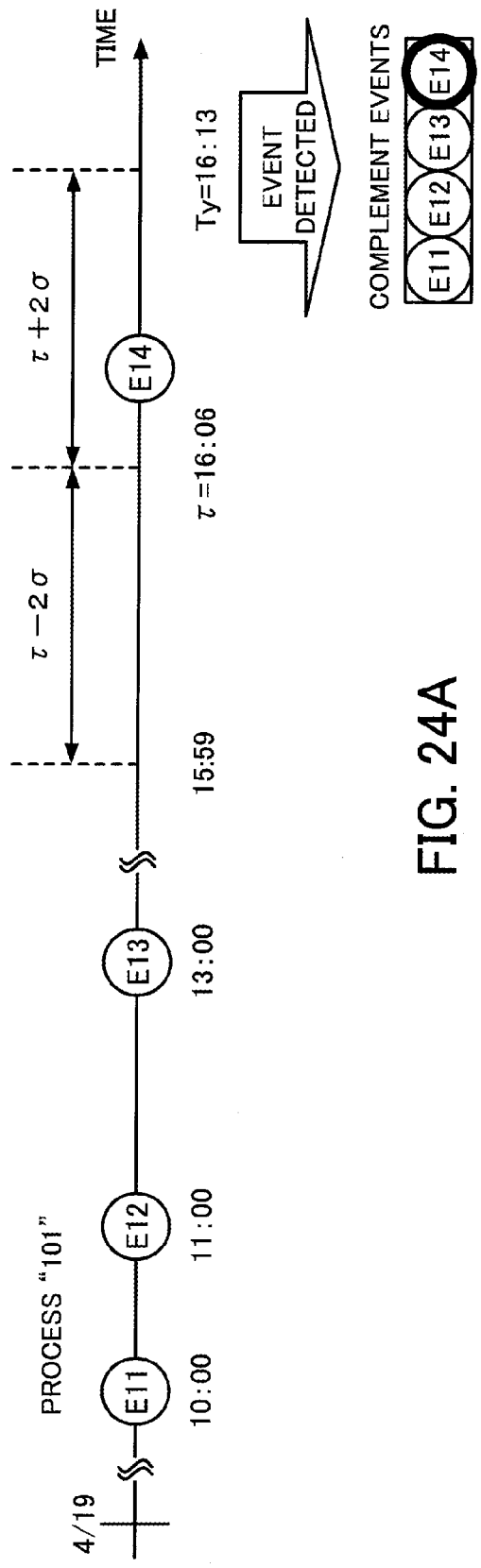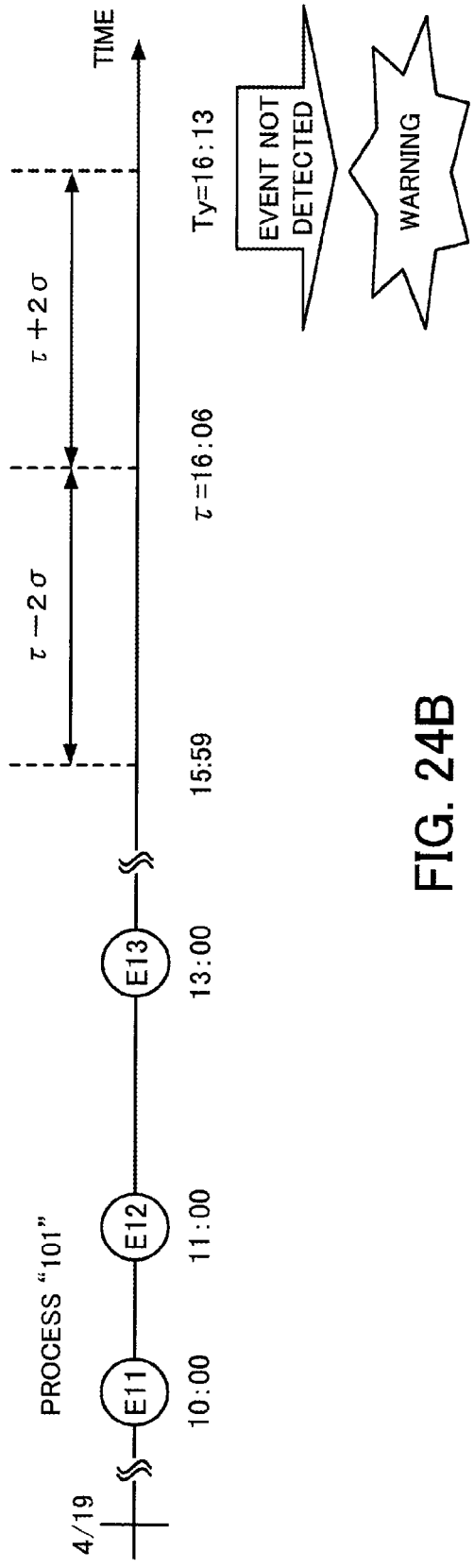
FIG. 24A
FIG. 24B

INFORMATION ACQUISITION METHOD AND INFORMATION ACQUISITION APPARATUS

CROSS-REFERENCE TO RELATED APPLICATION

This application is based upon and claims the benefit of priority of the prior Japanese Patent Application No. 2013-149565, filed on Jul. 18, 2013, the entire contents of which are incorporated herein by reference.

FIELD

The embodiments discussed herein relate to an information acquisition method and an information acquisition apparatus.

BACKGROUND

At present, information processing systems that include client apparatuses and server apparatuses are used. The client apparatuses are operated by users. The server apparatuses perform business processes. A client apparatus requests a server apparatus to perform a predetermined process. Another client apparatus is able to obtain the result of the predetermined process from the server apparatus and then to request the server apparatus to perform another process using the obtained result. For example, such an information processing system facilitates smooth execution of a series of activities (for example, receipt, quotation, approval, etc.) that involve a plurality of users within an organization.

In such an information processing system, there is an attempt to visualize a flow (a processing flow) related to a series of business processes. For example, there has been proposed a technique of, when a range of data to be analyzed is specified by a user, creating a workflow diagram representing transfer of information between medical information devices by collecting and analyzing communicated data between the medical information devices in a hospital information system.

Please see, for example, Japanese Laid-open Patent Publication No. 2008-33754.

The current status of operations may be confirmed by continuously obtaining information on the operations. For example, by monitoring the records of operations while executing the operations, it is possible to extract and correct errors and bottlenecks in a processing flow. However, executing more operations on a system increases an amount of information to be analyzed. Therefore, if an attempt is made to monitor and analyze information regarding all operations in real-time (or at relatively short time intervals), the load for monitoring the information and the load for computational processing may increase.

On the other hand, if such analysis is carried out at relatively long time intervals (for example, daily, every week, every month, etc.), there occurs a problem of failing to promptly provide a portion that needs to be improved. For example, if some processes in a processing flow are completed by a certain time, information regarding these processes is available. However, information regarding the remaining processes in the processing flow may be obtained next time or some time later. This causes a delay in confirming the execution status of the entire processing flow.

SUMMARY

According to one aspect, there is provided a non-transitory computer-readable storage medium storing a computer program that causes a computer to perform a process including: obtaining first information indicating an execution status of a plurality of tasks related to each other; and obtaining, after obtaining the first information, an execution status of an unexecuted task included in the plurality of tasks, which was not yet executed when the first information was obtained, at an estimated time by which the unexecuted task is completed, the estimated time being estimated based on second information indicating past execution records of the plurality of tasks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a log table;
FIG. 7 illustrates an example of a flow type table;
FIG. 8 illustrates an example of a process management table;
FIG. 9 illustrates an example of a reference parameter table;
FIG. 10 illustrates an example of an event interval management table;
FIG. 11 illustrates an example of an event interval ratio evaluation table;
FIG. 12 illustrates an example of an operation interval management table;
FIG. 13 illustrates an example of an operation interval evaluation table;
FIG. 15 illustrates an example of a collection time table;
FIGS. 24A and 24B illustrate specific examples of targeted collection.

DESCRIPTION OF EMBODIMENTS

Figure 1:
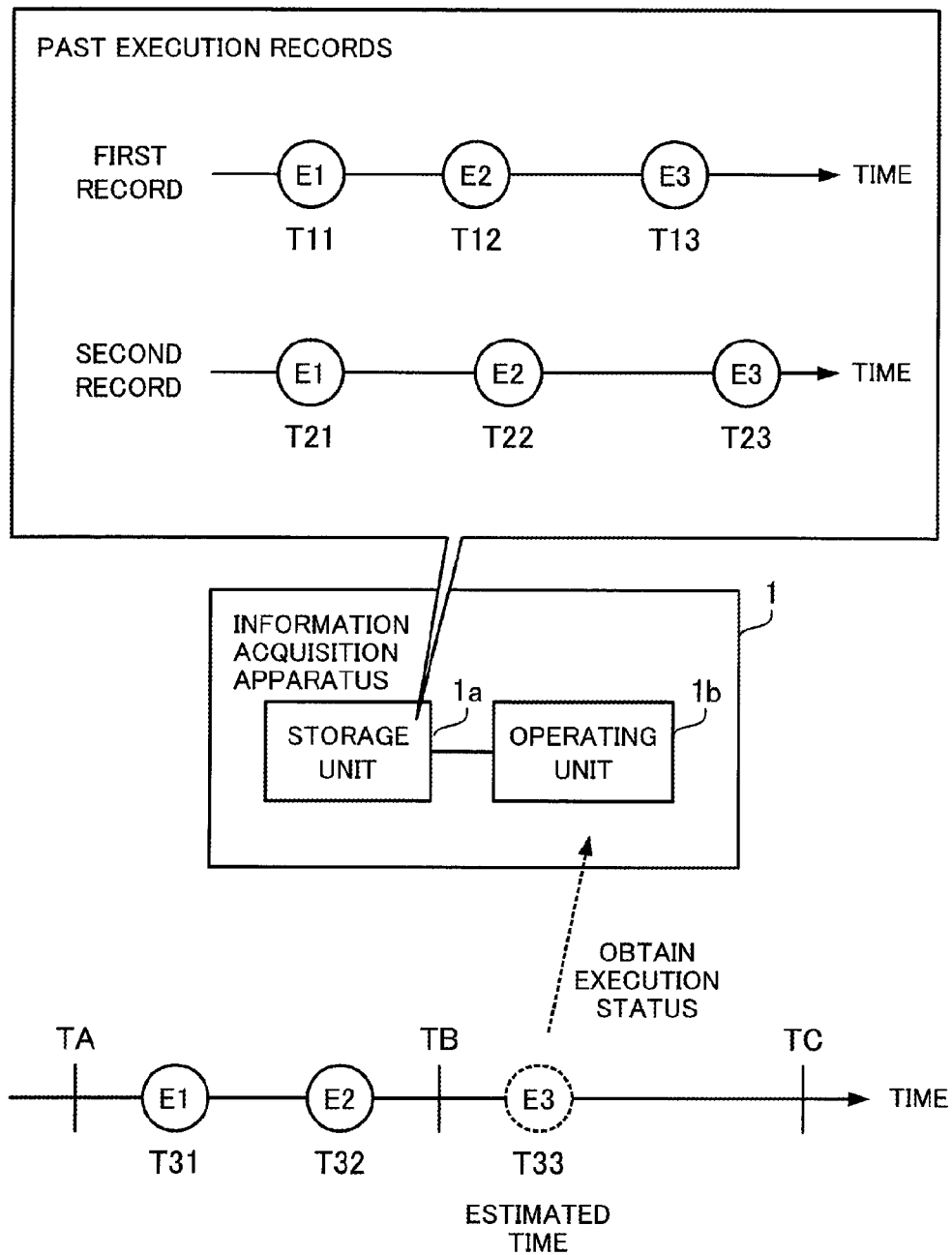
FIG. 1 illustrates an information acquisition apparatus according to a first embodiment.

Several embodiments will be described below with reference to the accompanying drawings, wherein like reference numerals refer to like elements throughout.

(First Embodiment)

FIG. 1 illustrates an information acquisition apparatus according to a first embodiment. An information acquisition apparatus 1 obtains information indicating the execution status of flows (processing flows) each representing a series of tasks involved in an operation. For example, the information acquisition apparatus 1 monitors and analyzes the operations on the basis of the obtained information. The tasks involved in the operations may be executed on the information acquisition apparatus 1 or on other apparatuses connected to the information acquisition apparatus 1 over a network. For example, the information acquisition apparatus 1 may be designed to obtain the logs of tasks output from the other apparatuses and then to monitor and analyze the operations.

The information acquisition apparatus 1 includes a storage unit 1a and an operating unit 1b. The storage unit 1a may be a volatile storage device, such as a Random Access Memory (RAM), or a non-volatile storage device, such as a Hard Disk Drive (HDD) or a flash memory. The operating unit 1b may include a Central Processing Unit (CPU), a Digital Signal Processor (DSP), an Application Specific Integrated Circuit (ASIC), a Field Programmable Gate Array (FPGA), and the like. The operating unit 1b may be a processor that runs a program. The "processor" here may include a set of a plurality of processors (multiprocessor).

The storage unit 1a stores information indicating the past execution records of a plurality of tasks related to each other. For example, an operation includes a series of tasks E1, E2, and E3. The tasks E1, E2, and E3 may represent events indicating that some activities (for example, ordering, quatation, approval, and the like) were carried out in response to prescribed user inputs.

For example, a plurality of past records regarding the operation is registered in the storage unit 1a. For example, a first record indicates that the tasks E1, E2, and E3 were executed at times T11, T12, and T13, respectively. A second record indicates that the tasks E1, E2, and E3 were executed at times T21, T22, and T23, respectively. In addition to these, a plurality of other records may be stored in the storage unit 1a.

The operating unit 1b obtains information indicating the execution records of executed tasks among a plurality of tasks. For example, the operating unit 1b obtains the information in accordance with a predetermined schedule. More specifically, the operating unit 1b obtains information indicating the execution records of the executed tasks E1 and E2 among the series of tasks E1, E2, and E3 at periodic collection time TB. The execution records indicate that the tasks E1 and E2 were executed at times T31 and T32, respectively. In this connection, FIG. 1 also exemplifies periodic collection times TA and TC.

The operating unit 1b obtains the execution status of an unexecuted task included in the plurality of tasks at the time by which the unexecuted task is completed and which is estimated based on information indicating the past execution records stored in the storage unit 1a and the newly obtained information indicating the execution records of executed tasks.

Considering the above example, the task E3 was not yet executed at the collection time TB. The operating unit 1b obtains the execution status of the task E3 at time T33 that is estimated based on the first and second records stored in the storage unit 1a and the execution records of the tasks E1 and E2 obtained at the collection time TB. The operating unit 1b may be designed to estimate the time T33.

Specifically, the operating unit 1b is able to detect from the first and second records that the tasks of the operation are executed at predetermined time intervals. For example, if it is determined from the past records that the time interval $\Delta T$ between the tasks E2 and E3 is almost fixed, the time T33 at which the task E3 is completed may be estimated by adding the time interval of $\Delta T$ to the execution time T32 of the task E2.

Alternatively, for example, if it is determined that a ratio $r=(\Delta T2/\Delta T1)$ of the time interval $\Delta T2$ between the tasks E2 and E3 to the time interval $\Delta T1$ between the tasks E1 and E2 is almost fixed, the time T33 at which the task E3 is completed may be estimated based on the ratio r. More specifically, the time T33 at which the task E3 is completed may be estimated by adding, to the time T32, a time period obtained by multiplying the time interval between the execution times T31 and T32 of the tasks E1 and E2 by the ratio r.

In addition, the operating unit 1b may estimate the time T33 by further adding a prescribed time period to the time point calculated as above. This is because the task E3 may not always be executed at the above-calculated time point, depending on a user's schedule. The operating unit 1b may determine how much time to add, according to a statistical tolerance obtained by analyzing past records.

In the information acquisition apparatus 1, the operating unit 1b obtains information indicating the execution records of the executed tasks E1 and E2 among the tasks E1, E2, and E3. Then, the operating unit 1b obtains the execution status of the unexecuted task E3 at the time T33 by which the unexecuted task E3 is completed and which is estimated based on the obtained information and information indicating the past execution records of the tasks E1, E2, and E3.

The above technique makes it possible to efficiently obtain the execution status of tasks. For example, consider the situation where information regarding all operations is periodically analyzed and then a notification of portions that need to be improved is made. In this situation, however, it may be difficult to promptly obtain the execution status of tasks, depending on operations. Considering the case where information regarding an operation is obtained at the periodic collection times TA, TB, and TC, as exemplified above, the execution status of the tasks E1 and E2 are obtained at the collection time TB, but the execution status of the unexecuted process E3 is not available and becomes available at the next collection time TC. That is, a delay occurs in confirming the execution status of the operation including the tasks E1, E2, and E3, which makes it difficult to promptly provide analysis results. To deal with this, there is considered an approach of setting a short interval between the collection times TA, TB, and TC. However, a shorter interval increases the frequency of monitoring and analysis processes, which leads to increasing the workload of the information acquisition apparatus 1. Another approach might be to keep on monitoring until the task E3 is executed. However, this approach also causes a high workload problem due to the continuous monitoring.

Considering the above, the information acquisition apparatus 1 obtains the execution status of the task E3, which was not yet executed at the collection time TB, at the time T33 that is estimated based on the execution records of the tasks E1 and E2 obtained at the collection time TB and the past execution records of the tasks E1, E2, and E3. This makes it possible to obtain the execution status of the unexecuted task E3 prior to the next collection time TC. Therefore, if an error, such as non-execution of the task E3, occurs, a warning may be issued early to a user. This prevents the risk of the task E3 remaining unexecuted until the collection time TC. In addition, at the collection time T33, it is possible to conduct analysis focusing on the task E3, which suppresses an increase in the workload of the information acquisition apparatus 1 for the analysis, compared with the case of analyzing other operations together.

In this connection, the operating unit 1b may obtain the execution status of only the task E3 at the time T33. That is to say, the operating unit 1b may be designed not to obtain the execution status of the tasks E1 and E2, which were already obtained at the collection time TB. Obtaining the same information as obtained before is a redundant process. Suppressing such a redundant process further reduces the workload of the information acquisition apparatus 1 and contributes to efficient confirmation of the execution status of the task E3 that is not completed.

(Second Embodiment)

Figure 2:
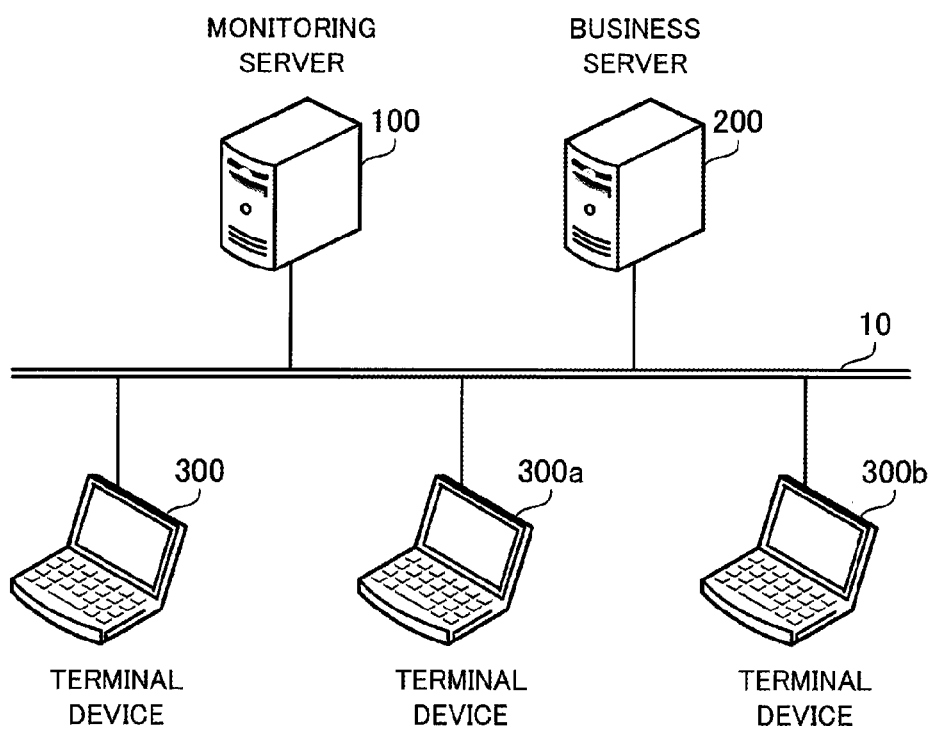
FIG. 2 illustrates an information acquisition apparatus according to a second embodiment.

FIG. 2 illustrates an information processing system according to a second embodiment. The information processing system of the second embodiment includes a monitoring server 100, a business server 200, and terminal devices 300, 300a, and 300b. The monitoring server 100, business server 200, and terminal devices 300, 300a, and 300b are connected to a network 10. The network 10 may be a Local Area Network (LAN), a wide-area network (WAN), the Internet, or the like.

The monitoring server 100 is a server computer that provides Business Activity Monitoring (BAM) functionality. The monitoring server 100 monitors whether intended operations are appropriately executed on the information processing system or not. The monitoring server 100 obtains history information (logs) regarding the tasks of the operations executed on the business server 200. The monitoring server 100 creates processing flows (called workflows) regarding the operations on the basis of the logs, in order to visualize the flows of the actually executed operations or to analyze the execution status of the operations. In this connection, an operation may include a plurality of activities (for example, ordering, quotation, approval, and so on), which are done by one or more users. The monitoring server 100 provides the terminal devices 300, 300a, and 300b with the analysis results of the operations. The monitoring server 100 is one example of the information acquisition apparatus 1 of the first embodiment.

The business server 200 is a server computer that executes tasks involved in various operations in accordance with instructions from the terminal devices 300, 300a, and 300b. The business server 200 continuously generates and stores, for each activity of operations, a log including event information of an event indicating that the activity was executed and information indicating when the event occurred. One operation may be associated with a plurality of events. The business server 200 provides the monitoring server 100 with the logs. In this connection, a plurality of business servers 200 may be provided, depending on operations. For example, another server apparatus may be provided to collectively manage logs output from a plurality of business servers and to provide the monitoring server 100 with the logs.

The terminal devices 300, 300a, and 300b are client computers that are used by users. The users operate the terminal devices 300, 300a, and 300b to request the business server 200 to execute tasks for users' activities. The terminal devices 300, 300a, and 300b are able to access the monitoring server 100 to obtain the analysis results of operations. The users operate the terminal devices 300, 300a, and 300b to confirm the analysis results. For example, a user confirms a portion where a delay has occurred in a workflow from the occurrences of events.

Figure 3:
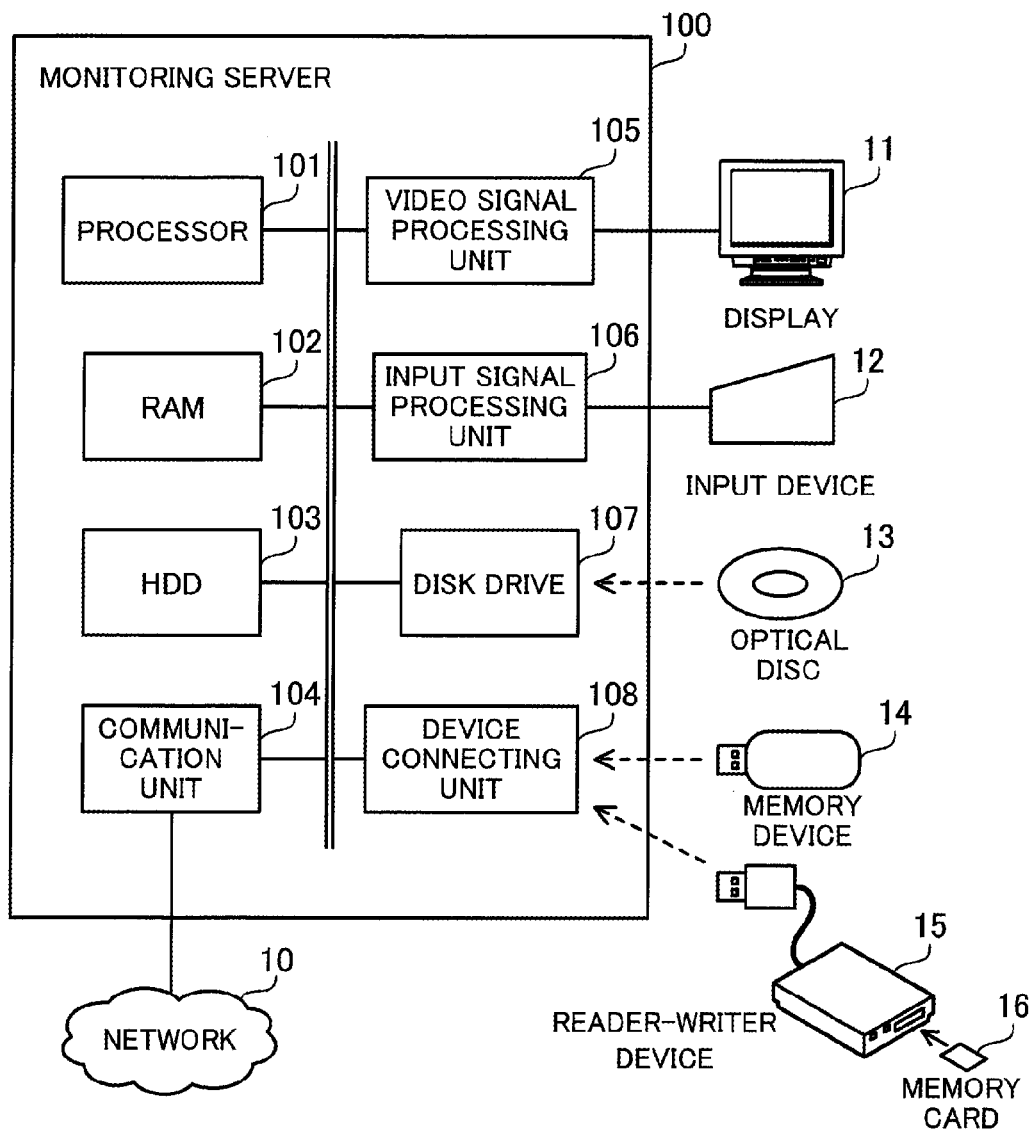
FIG. 3 illustrates an example of a hardware configuration of a monitoring server.

FIG. 3 illustrates an example of a hardware configuration of a monitoring server. The monitoring server 100 includes a processor 101, a RAM 102, an HDD 103, a communication unit 104, a video signal processing unit 105, an input signal processing unit 106, a disk drive 107, and a device connecting unit 108. Each unit is connected to a bus of the monitoring server 100. In this connection, the business server 200 and terminal devices 300, 300a, and 300b may be configured with the same hardware as the monitoring server 100.

The processor 101 controls information processing that is performed by the monitoring server 100. The processor 101 may be, for example, a CPU, a DSP, an ASIC, an FPGA, or another. The processor 101 may be a multiprocessor. Furthermore, the processor 101 may be a combination of two or more units selected from among a CPU, a DSP, an ASIC, an FPGA, and others.

The RAM 102 is a primary storage device of the monitoring server 100. The RAM 102 temporarily stores at least part of Operating System (OS) programs and application programs to be executed by the processor 101. The RAM 102 also stores various data to be used while the processor 101 operates.

The HDD 103 is a secondary storage device of the monitoring server 100. The HDD 103 magnetically writes and reads data on a built-in magnetic disk. The HDD 103 stores the OS programs, application programs, and various data. The monitoring server 100 may be provided with another kind of secondary storage device, such as a flash memory, a Solid State Drive (SSD), or the like, or with a plurality of secondary storage devices.

The communication unit 104 is a communication interface that performs communications with other computers over a network 10. The communication unit 104 may be either a wired communication interface or a wireless communication interface.

The video signal processing unit 105 outputs images to a display 11 connected to the monitoring server 100 in accordance with instructions from the processor 101. As the display 11, a Cathode Ray Tube (CR) display, a liquid crystal display, or another may be used.

The input signal processing unit 106 receives an input signal from an input device 12 connected to the monitoring server 100 and outputs the input signal to the processor 101. As the input device 12, a pointing device, such as a mouse, a touch panel, or the like, a keyboard, or another may be used.

The disk drive 107 is a driving device that reads programs and data from an optical disc 13 with laser beams or the like. As the optical disc 13, for example, a Digital Versatile Disc (DVD), a DVD-RAM, a CD-ROM (Compact Disc Read Only Memory), a CD-R (recordable), a CD-RW (ReWritable), or another may be used. For example, the disk drive 107 reads programs and data read from the optical disc 13 and stores them in the RAM 102 or the HDD 103 in accordance with instructions from the processor 101.

The device connecting unit 108 is a communication interface that allows peripherals to be connected to the monitoring server 100. For example, a memory device 14 and a reader-writer device 15 are connected to the device connecting unit 108. The memory device 14 is a recording medium provided with a function of communicating with the device connecting unit 108. The reader-writer device 15 reads and writes data on a memory card 16. The memory card 16 is a card-type recording medium. For example, the device connecting unit 108 stores programs and data read from the memory device 14 or the memory card 16 to the RAM 102 or the HDD 103 in accordance with instructions from the processor 101.

Figure 4:
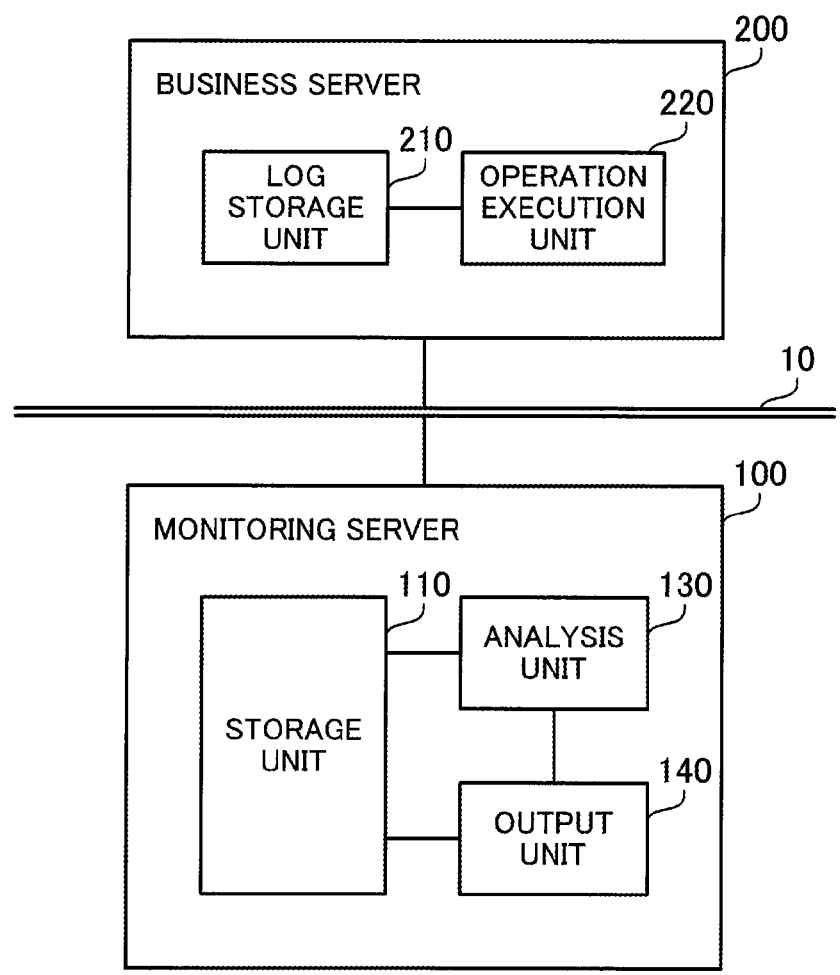
FIG. 4 illustrates an example of functions of a monitoring server.

FIG. 4 illustrates an example of functions of a monitoring server. The monitoring server 100 includes a storage unit 110, an analysis unit 130, and an output unit 140. The storage unit 110 is realized as a storage area prepared in the RAM 102 or the HDD 103. The analysis unit 130 and output unit 140 are realized as software modules to be executed by the processor 101.

The storage unit 110 stores information that is used in processing of the analysis unit 130 and output unit 140. The information stored in the storage unit 110 includes information (information indicating correspondences between workflow types and a plurality of events) that is used for creating a workflow from events indicated in logs and information indicating a schedule of obtaining logs from the business server 200.

The analysis unit 130 collects logs output from the business server 200 and detects the execution status of workflows. The analysis unit 130 monitors the execution status of each activity included in the workflows. The analysis unit 130 collects the logs with two different timing patterns and analyzes the workflows.

The first timing pattern is a periodic timing pattern. For example, daily, weekly, or monthly collection times may be scheduled. In this periodic log collection (periodic collection), the analysis unit 130 collects and analyzes logs regarding all operations to be analyzed.

The second timing pattern refers to a single time specified for each operation. In the log collection at a specified single time (targeted collection), the analysis unit 130 collects and analyzes a log regarding a specified operation. The targeted collection is performed in order to confirm the occurrence of an event (the execution status of the task of the event) that was not obtained through the periodic collection among the events included in each workflow. In this connection, the times based on the first and the second timing patterns are registered as information indicating the above schedule in the storage unit 110.

The analysis unit 130 analyzes the past execution records of each operation, determines a time based on the second timing pattern for each operation, and performs the targeted collection. More specifically, for each operation, the analysis unit 130 evaluates whether the ratios of the time intervals (event intervals) between events belonging to the operation have a stationarity property or not. If the ratios of the event intervals between a plurality of events belonging to a single operation are fixed within a predetermined tolerance, the ratios of the event intervals are evaluated to have a stationarity property. In this case, by measuring the event interval between at least first two events in the workflow, it is possible to estimate when an event whose log is not yet obtained occurs.

In addition, the analysis unit 130 evaluates whether intervals (operation intervals) between occurrences of an operation have a stationarity property or not. An operation interval of a single operation means the interval between the occurrence times of the first event of the events belonging to the operation. If the operation intervals of an operation are fixed within a predetermined tolerance, the operation intervals of the operation are evaluated to have a stationarity property.

The output unit 140 provides an analysis result obtained by the analysis unit 130. For example, the output unit 140 is able to provide the terminal devices 300, 300a, and 300b with a workflow diagram visualizing a workflow and information on delayed activities in the workflow. In addition, the output unit 140 may display the workflow diagram and other information on the display 11.

The business server 200 includes a log storage unit 210 and an operation execution unit 220. The log storage unit 210 may be realized as a storage area prepared in a RAM or an HDD provided in the business server 200. The operation execution unit 220 may be realized as a software module to be executed by a processor provided in the business server 200.

The log storage unit 210 stores logs output from the operation execution unit 220. The logs stored in the log storage unit 210 may be referenced by the analysis unit 130. In this connection, as described earlier, another server apparatus may be provided to obtain logs from the business server 200 and to provide the monitoring server 100 with the logs.

The operation execution unit 220 executes tasks involved in a variety of operations in accordance with requests from the terminal devices 300, 300a, and 300b. The operation execution unit 220 generates a log for an executed task and stores the log in the log storage unit 210. As described earlier, the log includes event information indicating the task was executed and a timestamp indicating when the task was executed.

FIG. 5 illustrates an example of a log table. A log table 111 contains information indicating a history of events (execution records of tasks in workflows). The information in the log table 111 is obtained by the analysis unit 130 from the business server 200 and is then stored in the storage unit 110. The log table 111 includes fields for IDentifier (ID), timestamp, worker ID, and event name.

The ID field contains the identifier information (ID) identifying an operation. The same ID is given to log records relating to the same operation. The timestamp field contains a timestamp indicating when the log record was recorded. The timestamp may be said to indicate when an event occurred or when the task of the event was executed. For example, the timestamp is represented in the format of year, month, date, hour, minute, and second. In this example, however, the timestamp is represented in the format of year, month, date, hour, and minute, for convenience of explanation. The worker ID field contains the ID (worker ID) of a user who executed the activity involved in the event. The event name field contains the name of the event that occurred.

For example, the log table 111 has a record with an ID of "001", a timestamp of "2013/04/15 10:00", a worker ID of "N1", and an event name of "receipt". This record indicates that the activity involved in an event named "receipt" was executed by a user having a worker ID of "N1" at 10:00 on Apr. 15, 2013.

Alternatively, the record may be said to indicate that the event named "receipt" occurred at 10:00 on Apr. 15, 2013. Yet alternatively, the record may be said to indicate that the task of the event named "receipt" was executed at 10:00 on Apr. 15, 2013.

As described earlier, the same ID is given to related logs in the log table 111. Therefore, the analysis unit 130 is able to recognize the related logs on the basis of the ID.

Figure 6:
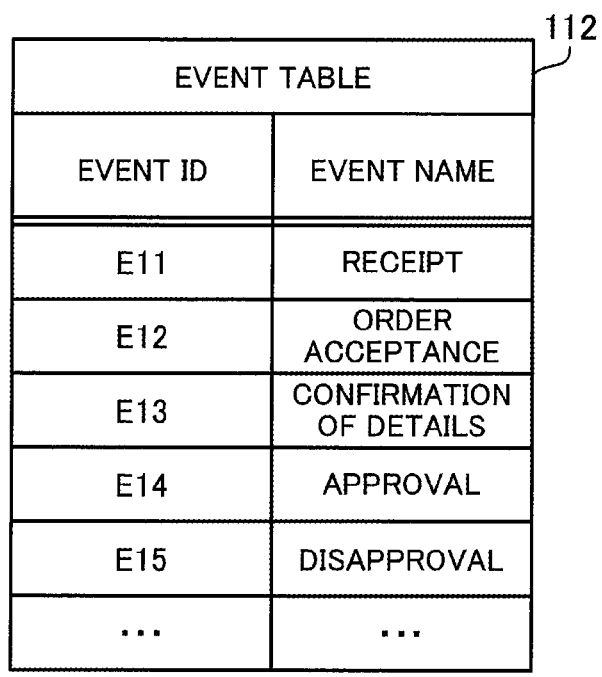
FIG. 6 illustrates an example of an event table.

FIG. 6 illustrates an example of an event table. An event table 112 contains information indicting correspondences between event IDs and event names. The event table 112 is previously stored in the storage unit 110 and includes fields for event ID and event name.

The event ID field contains an event ID. The event name field contains an event name. For example, the event table 112 has a record with an event ID of "E11" and an event name of "receipt". This record indicates that an event with an event ID of "E11" is named "receipt".

In this way, one event ID is associated with one event. In the following description, for example, an event with the event ID of "E11" may be abbreviated to an event "E11".

FIG. 7 illustrates an example of a flow type table. A flow type table 113 contains information indicating correspondences between the types of workflows (flow types) and event IDs. The flow type table 113 is previously stored in the storage unit 110 and includes fields for flow type ID and event ID.

The flow type ID field contains a flow type ID. The event ID field contains an event ID. For example, the flow type table 113 has a record with a flow type ID of "F1" and event IDs of "E11, E12, E13, and E14". This record indicates that a workflow with a flow type ID of "F1" is made up of a series of events "E11, E12, E13, and E14".

In this connection, the event IDs of "E11, E12, E13, and E14" associated with the flow type ID of "F1" also specify a sequence of occurrences of the events. That is, in a workflow with the flow type ID of "F1", the events "E11", "E12", "E13", and "E14" occur in this sequence. In the following description, a flow type with the flow type ID of "F1" may be abbreviated to a flow type "F1".

FIG. 8 illustrates an example of a process management table. A process management table 114 contains information indicating correspondences between process IDs and flow type IDs. The process management table 114 is stored in the storage unit 110 and includes fields for process ID and flow type ID.

The process ID field contains a process ID. The "process" here is an object (flow instance) that actually occurs in a workflow of certain flow type. The process may be called an operation process. A plurality of events belonging to the same process has the same process ID. In the second embodiment, a process ID may be associated with an ID indicated in the log table 111. In the following example, the IDs in the log table 111 match the process IDs. However, information that is uniquely derived from an ID registered in the log table 111 may be used as the process ID. The flow type ID field contains a flow type ID.

For example, the process management table 114 has a record with a process ID of "001" and a flow type ID of "F1". This record indicates that a process (flow instance) with a process ID of "001" is of a flow type "F1". In the following description, for example, a process with the process ID of "001" may be abbreviated to a process "001".

FIG. 9 illustrates an example of a reference parameter table. A reference parameter table 115 contains parameters for evaluating whether a stationarity property exists or not, for each flow type. The reference parameter table 115 is previously stored in the storage unit 110 and includes fields for flow type ID, determination reference value, and reference standard deviation.

The flow type ID field contains a flow type ID. The determination reference value field indicates the number of processes that need to be accumulated for analysis. Since statistical analysis is carried out, a certain number of processes need to be sampled need to be accumulated for high reliable evaluation. The determination reference value is a threshold for the number of processes to be sampled (analysis is carried out only when there are samples more than the determination reference value). The reference standard deviation field is divided into subfields for event interval ratio and operation interval.

The event interval ratio field indicates the value (standard deviation) of a statistical tolerance to be used for determining whether the ratios of event intervals (event interval ratios) are fixed or not. The operation interval field indicates the value (standard deviation) of a statistical tolerance to be used for determining whether operation intervals are fixed or not.

For example, the reference parameter table 115 has a record with a flow type ID of "F1", a determination reference value of "3", a reference standard deviation of "0.03" for event interval ratio, and a reference standard deviation of "2.5" for operation interval. This record indicates that, in the case of the workflow "F1", it is evaluated whether a stationarity property exists or not when processes more than or equal to three, being the determination reference value of "3", have been obtained as samples. The record also indicates that it is evaluated that the event interval ratios of the flow type "F1" are almost fixed (have a stationarty property) in the case where variations in the event interval ratios measured with respect to the workflow "F1" fall within a predetermined range defined by the standard deviation of "0.03". The record further indicates that it is evaluated that the operation intervals of the workflow "F1" are almost fixed (have a stationarity property) in the case where variations in the operation intervals measured with respect to the workflow "F1" fall within a predetermined range defined by the standard deviation of "2.5".

In this connection, the determination reference value may appropriately be set according to a flow type. For example, a lower limit number of samples, e.g., "50" or "100", may be set to thereby improve the reliability of statistics.

FIG. 10 illustrates an example of an event interval management table. An event interval management table 116 contains information indicating time intervals between events. The event interval management table 116 is stored in the storage unit 110 and includes fields for flow type ID, process ID, interval #1, interval #2, and interval #3.

The flow type ID field contains a flow type ID. The process ID field contains a process ID. The interval #1 field indicates the time interval between the occurrences of the first and the second events in a workflow of the corresponding flow type ID. The interval #2 field indicates the time interval between the occurrences of the second and the third events. The interval #3 field indicates the time interval between the occurrences of the third and the fourth events.

In this connection, four events belong to each process ID relating to the flow type "F1". Therefore, the event interval management table 116 manages the intervals #1 to #3. However, there may be a flow type to which three events or five or more events belong, depending on a process ID. For example, in the case where a flow type is made up of five events, the event interval management table 116 manages intervals #1 to #4.

For example, the event interval management table 116 has a record with a flow type of "F1", a process ID of "001", an interval #1 of "1 hour (h)", an interval #2 of "2 h", and an interval #3 of "3 h". This record indicates that, in the process "001" of the workflow "F1", there was a time interval of one hour between the occurrence of the event "E11" and the occurrence of the event "E12". The record also indicates that there was a time interval of two hours between the occurrence of the event "E12" and the occurrence of the event "E13". The record further indicates that there was a time interval of three hours between the occurrence of the event "E13" and the occurrence of the event "E14".

In other words, the record may be said to indicate that, in the process "001" of the workflow "F1", there was a time interval of one hour between completion of the task of the event "E11" and completion of the task of the event "E12", there was a time interval of two hours between completion of the task of the event "E12" and completion of the task of the event "E13", and there was a time interval of three hours between completion of the task of the event "E13" and completion of the task of the event "E14".

The interval #1 to #3 fields may also be said to indicate event interval ratios for each process. More specifically, in the case of the process "001", a total time taken from the event "E11" to the event "E14" is calculated as 1 h+2 h+3 h=6 h. Therefore, the event interval ratio of the time interval between the event "E11" and the event "E12" to the total time is 1/6. The event interval ratio of the time interval between the event "E12" and the event "E13" to the total time is 2/6=1/3. The event interval ratio of the time interval between the event "E13" and the event "E14" to the total time is 3/6=1/2.

In this connection, the record of a process "101" has a null value ("- (hyphen)") in the interval #3 field. This is because the log of the event "E14" of the process "101" was not yet obtained at the time of FIG. 10.

FIG. 11 illustrates an example of an event interval ratio evaluation table. An event interval ratio evaluation table 117 contains information for managing the statistics of event interval ratios. The event interval ratio evaluation table 117 is stored in the storage unit 110 and includes fields for flow type ID, sample count, event interval, mean of event interval ratio, standard deviation of event interval ratio, exception range, and stationarity property.

The flow type ID field contains a flow type ID. The sample count field indicates the number of processes used as samples in statistical processing. The event interval field contains information indicating events between which an interval is. The field for mean of event interval ratio indicates the mean (m1) of the event interval ratios obtained from past records. The field for standard deviation of event interval ratio indicates the standard deviation (σ1) of the mean of the event interval ratios obtained from the past records.

The exception range field indicates an exception range for an event interval ratio. As will be described later, in the case where any event interval ratio of the time intervals between events falls within the exception range, a corresponding process is excluded from being sampled for calculating the mean and the standard deviation of event interval ratio. The exception range is calculated based on the above mean (m1) and standard deviation (σ1). In the second embodiment, the exception range is set to be m1+2σ1 or greater and m1−2 σ1 or less, by way of example.

The stationarity property field contains information indicating whether the event interval ratios of the corresponding flow type have a stationarity property or not. An initial value in the stationarity property field indicates that a stationarity property does not exist.

For example, the event interval ratio evaluation table 117 has a record with a flow type ID of "F1", a sample count of "3", an event interval of "interval #1 (E11-E12)", a mean of event interval ratio of "0.1588", a standard deviation of event interval ratio of "0.01", an exception range of "0.1788 or greater and 0.1388 or less", and a stationarity property of "exist".

This record indicates that, with respect to the flow type "F1", three processes, i.e., processes "001", "011", and "021", were used as samples for calculating the mean and the standard deviation of event interval ratio. In this connection, as will be described later, a process "031" registered in the event interval management table 116 is excluded from being sampled because this process has a large deviation. In addition, the process "101" is also excluded from being sampled because it includes an event that did not yet occur and therefore is incomplete at the time the event interval management table 116 was generated.

The record also indicates that the mean and the standard deviation of the event interval ratio of the time interval between the timestamps of the events "E11" and "E12" to the time interval (total time interval) between the timestamps of the events "E11" and "E14" are "0.1588" and "0.01", respectively. The record further indicates that processes in which the event interval ratio of the time interval between the events "E11" and "E12" to the total time interval falls within the exception range of "0.1788 or greater and 0.1388 or less" are taken as exceptions and are excluded from being sampled for the statistical processing. Furthermore, the record indicates that the flow type "F1" has a stationarity property in terms of event interval ratio.

FIG. 12 illustrates an example of an operation interval management table. An operation interval management table 118 contains information regarding intervals between occurrences of operations. The operation interval management table 118 is stored in the storage unit 110 and includes fields for flow type ID, process ID, timestamp, and operation interval.

The flow type ID field contains a flow type ID. The process ID field contains a process ID. A timestamp field contains the timestamp of the first event in the process. The operation interval field indicates, with respect to the process, the time interval between the timestamp of its previous process, which has the same flow type ID as the process and was performed immediately before the process, and the timestamp of the process. With respect to a process that was performed first among processes of the same flow type ID, there is no previous process, and therefore a null value "−" is set in the operation interval field.

For example, the operation interval management table 118 has a record with a flow type ID of "F1", a process ID of "001", a timestamp of "2013/04/15 10:00", and an operation interval of "−". This record indicates that the first event in the process "001" of the workflow "F1" occurred at 10:00 on Apr. 15, 2013. This process "001" was executed first among the processes of the flow type "F1", and therefore no operation interval is registered.

The operation interval management table 118 includes another record with a flow type ID of "F1", a process ID of "011", a timestamp of "2013/04/16 10:00", and an operation interval of "24 h". This record indicates that the first event in the process "011" of the workflow "F1" occurred at 10:00 on Apr. 16, 2013. The record also indicates that there is a time interval of "24" hours between the timestamp of the previous process "001" of the workflow "F1" and the timestamp of the process "011".

FIG. 13 illustrates an example of an operation interval evaluation table. An operation interval evaluation table 119 contains information for managing the statistics of operation intervals. The operation interval evaluation table 119 is stored in the storage unit 110 and includes fields for flow type ID, sample count, mean of operation interval, standard deviation of operation interval, exception range, and stationarity property.

The flow type ID field contains a flow type ID. The sample count field indicates the number of samples used in statistical processing. The field for mean of operation interval indicates the mean (m2) of the operation intervals obtained from past records. The field for standard deviation of operation interval indicates the standard deviation (σ2) of the mean of the operation intervals obtained from the past records.

The exception range field indicates an exception range for an operation interval. As will be described later, in the case where an operation interval falls within the exception range, a corresponding process is excluded from being sampled for calculating the mean and the standard deviation of operation interval. The exception range is calculated based on the above mean (m2) and standard deviation (σ2). In the second embodiment, the exception range is set to be m2+2σ2 or greater and m2−2σ2 or less, by way of example.

The stationarity property field contains information indicating whether the operation intervals of the corresponding flow type have a stationarity property or not. An initial value in the stationarity property field indicates that a stationarity property does not exist.

For example, the operation interval evaluation table 119 has a record with a flow type ID of "F1", a sample count of "3", a mean of operation interval of "25 h", a standard deviation of operation interval of "1 h", an exception range of "27 h or greater and 23 h or less", and a stationarity property of "exist".

This record indicates that, with respect to the flow type "F1", three processes were used as samples for calculating the mean and the standard deviation of operation interval. The record also indicates that the mean and the standard deviation of operation interval are 25 h and 1 h, respectively. The record further indicates that processes in which an operation interval falls within the exception range of "27 h or greater and 23 h or less" are taken as exceptions and are excluded from being sampled for the statistical processing. For example, referring to the operation interval management table 118, the process "031" is excluded from being sampled for the next statistical processing. Furthermore, the record indicates that the flow type "F1" has a stationarity property in terms of operation interval.

In this connection, incomplete processes are excluded from being sampled. However, since the operation interval of such an incomplete process may be obtained based on the first event, the incomplete process may be used as a sample in calculating the mean and standard deviation of operation interval.

Figure 14:
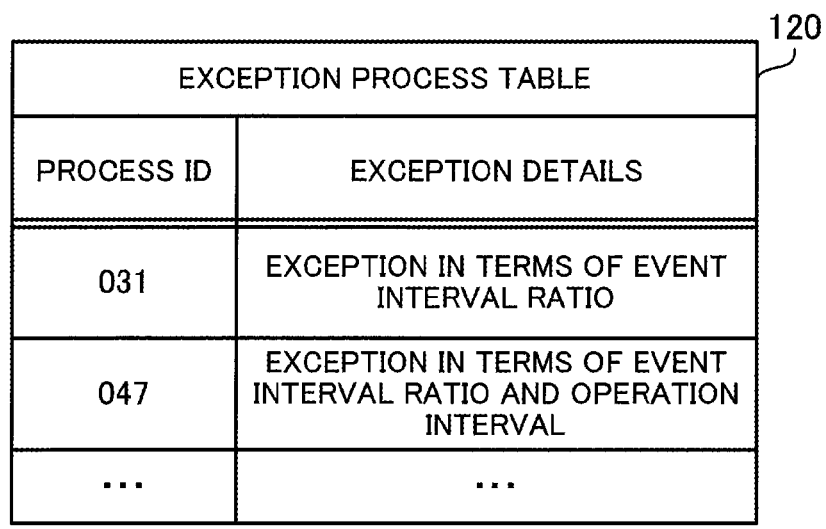
FIG. 14 illustrates an example of an exception process table.

FIG. 14 illustrates an example of an exception process table. An exception process table 120 contains information regarding processes taken as exceptions. The exception process table 120 is stored in the storage unit 110 and includes fields for process ID and exception details.

The process ID field contains a process ID. The exception details field contains information indicating the details of exception. For example, the exception process table 120 has a record with a process ID of "031" and exception details of "exception in terms of event interval ratio". This record indicates that the process "031" is taken as an exception in terms of event interval ratio.

FIG. 15 illustrates an example of a collection time table. A collection time table 121 contains information indicating what time to perform targeted collection of logs relating to events that did not occur. The collection time table 121 is stored in the storage unit 110 and includes fields for process ID, event ID, limit time, and targeted collection time.

The process ID field contains a process ID. The event ID field contains the event ID of an event that did not occur. The limit time field indicates an allowable lower limit (most recent) time for the occurrence time of the event. The targeted collection time field indicates a time to perform targeted collection. The limit time and the targeted collection time are calculated with reference to the event interval ratio evaluation table 117, as will be described later.

For example, the collection time table 121 has a record with a process ID of "101", an event ID of "E14", a limit time of "2013/04/19 15:59", and a targeted collection time of "2013/04/19 16:13". This record indicates that a log regarding an event "E14" that did not occur in the process "101" is to be collected through targeted collection at 16:13 on Apr. 19, 2013. The record also indicates that the log is to be collected if the event "E14" occurs on or after 15:59 on Apr. 19, 2013.

The analysis unit 130 records event intervals and an operation interval for each process in the event interval management table 116 and the operation interval management table 118. The analysis unit 130 also generates the event interval ratio evaluation table 117 and the operation interval evaluation table 119 for each flow type, and evaluates event interval ratios and operation intervals for each flow type.

The analysis unit 130 obtains logs with two methods, as described earlier. The first method is periodic collection and the second method is targeted collection. These methods for log collection will now be described.

Figure 16:
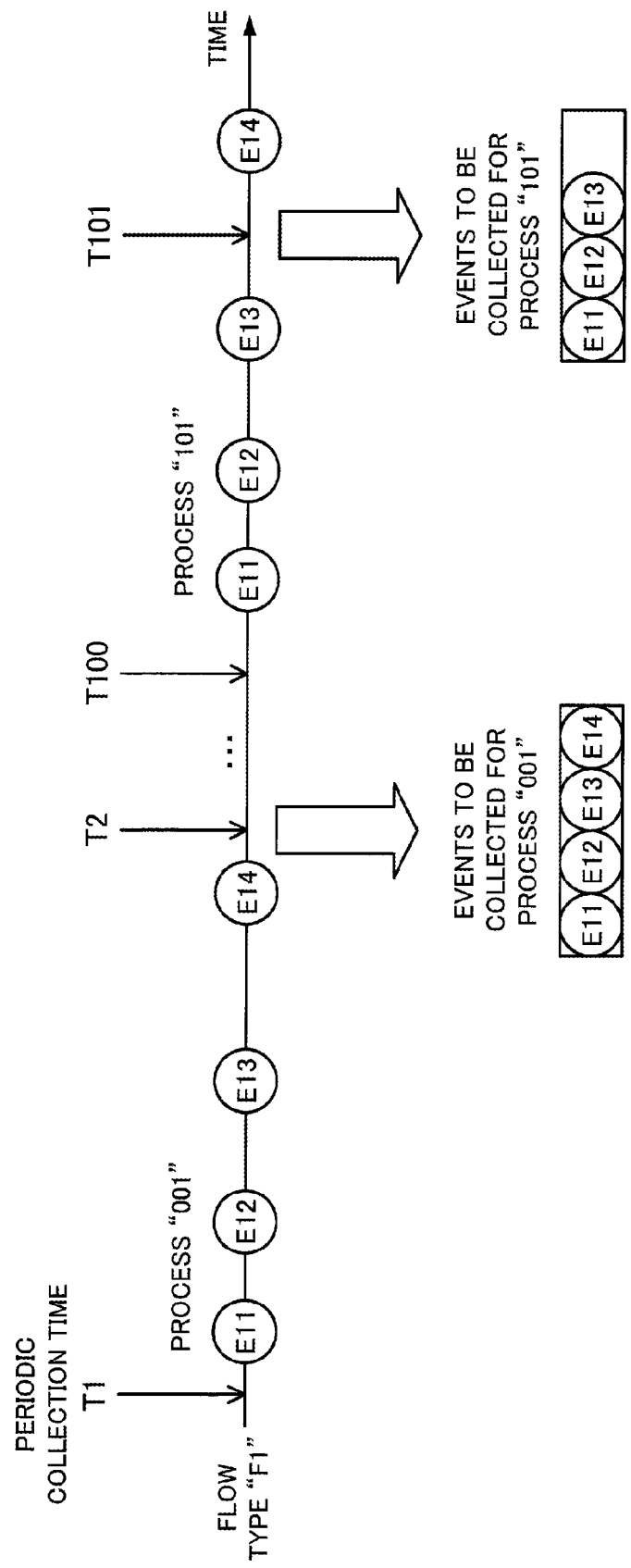
FIG. 16 illustrates an example of periodic collection.

FIG. 16 illustrates an example of periodic collection. The analysis unit 130 periodically collects logs from the business server 200. The periodic collection times are previously registered in the storage unit 110. For example, daily, weekly, monthly, or another time interval is registered. Referring to FIG. 16, periodic collection times T1, T2, . . . , T100, T101, are exemplified in time series.

With respect to the flow type "F1", there is no event belonging to processes of the flow type "F1" prior to the periodic collection time T1. Therefore, at the periodic collection time T1, no logs are obtained with respect to the events belonging to the processes of the flow type "F1".

Then, events "E11", "E12", "E13", and "E14" that belong to the process "001" of the flow type "F1" occur between the periodic collection times T1 and T2. Therefore, the logs of the events "E11", "E12", "E13", and "E14" belonging to the process "001" of the flow type "F1" are obtained at the periodic collection time T2.

Further, events "E11", "E12", and "E13" that belong to the process "101" of the flow type "F1" occur between the periodic collection times T100 and T101. Therefore, the logs of the events "E11", "E12", and "E13" belonging to the process "101" of the flow type "F1" are obtained at the periodic collection time T101. In this connection, an event "E14" that belongs to the process "101" does not yet occur at the periodic collection time T101, and therefore the log of the event "E14" is not obtained at the periodic collection time T101.

Figure 17:
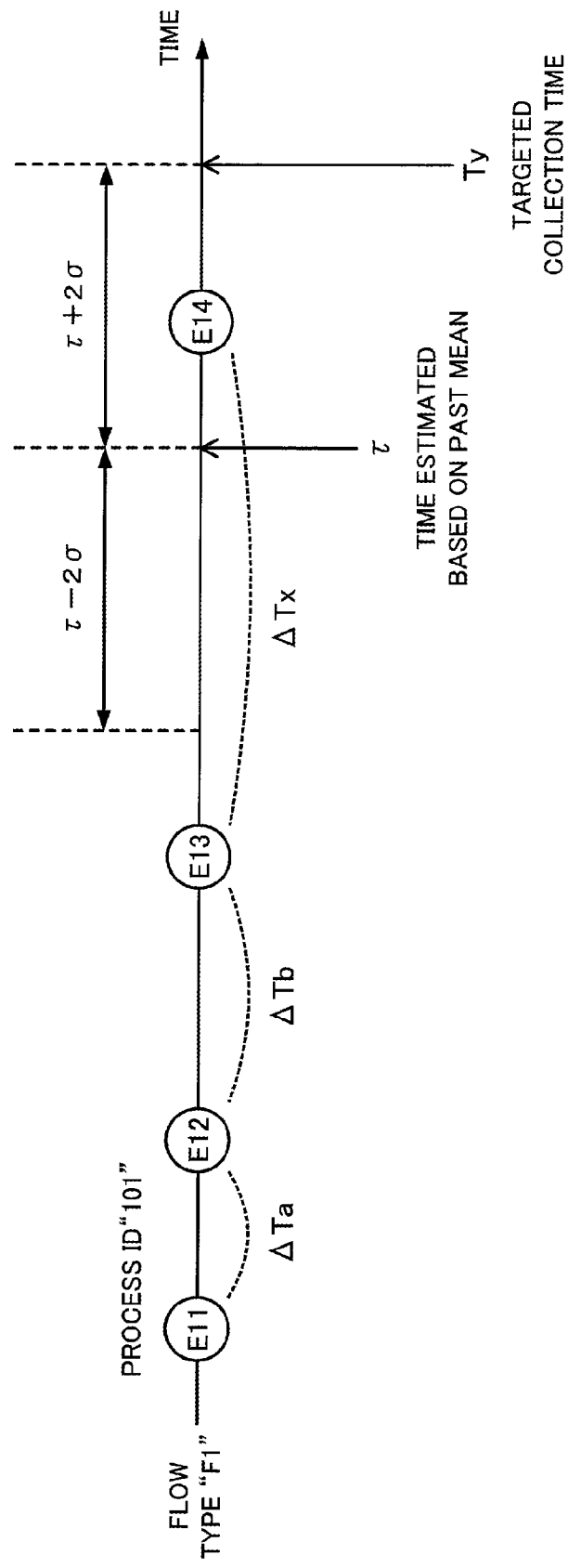
FIG. 17 illustrates an example of targeted collection.

FIG. 17 illustrates an example of targeted collection. As exemplified in FIG. 16, the event "E14" of the process "101" does not yet occur at the time T101. Therefore, the analysis unit 130 calculates when to collect the log of the event "E14" through targeted collection, on the basis of the past records on processes of the flow type "F1". More specifically, with respect to the process "101", the occurrence times of the events "E11", "E12", and "E13" are obtained. Therefore, the time interval ΔTa between the events "E11" and "E12" is obtained, and the time interval ΔTb between the events "E12" and "E13" is also obtained.

In addition, the mean of the event interval ratio of the time interval between the events "E13" and "E14" to each of the time intervals between these events is obtained from the past records. Therefore, it is estimated from the obtained information how long the interval will be between the events "E13" and "E14" of the process "101".

For example, assuming that the mean of the event interval ratio of the time interval between the events "E13" and "E14" to that between the events "E11" and "E12" is r1, an estimated time τ based on the mean is calculated by adding a time period of r1×ΔTa to the occurrence time of the event "E13" of the process "101".

Alternatively, assuming that the mean of the event interval ratio of the time interval between the events "E13" and "E14" to that between the events "E12" and "E13" is r2, an estimated time T based on the mean is calculated by adding a time period of r2×ΔTb to the occurrence time of the event "E13" of the process "101". The analysis unit 130 may calculate the time T using either r1 or r2. However, using r1 or r2, which has a smaller standard deviation, results in higher precision in estimating the time T.

Then, the analysis unit 130 determines the time ("τ+2σ") obtained by adding a time period of 2σ to the time τ, as a targeted collection time Ty. Symbol σ denotes a time into which the standard deviation of event interval ratio for the time interval between the events "E13" and "E14" of the flow type "F1" is converted. Since each event is executed by various users who are in different situations, giving some tolerance to the occurrence time of an event reduces a risk of failing to obtain a log through targeted collection.

Figure 18:
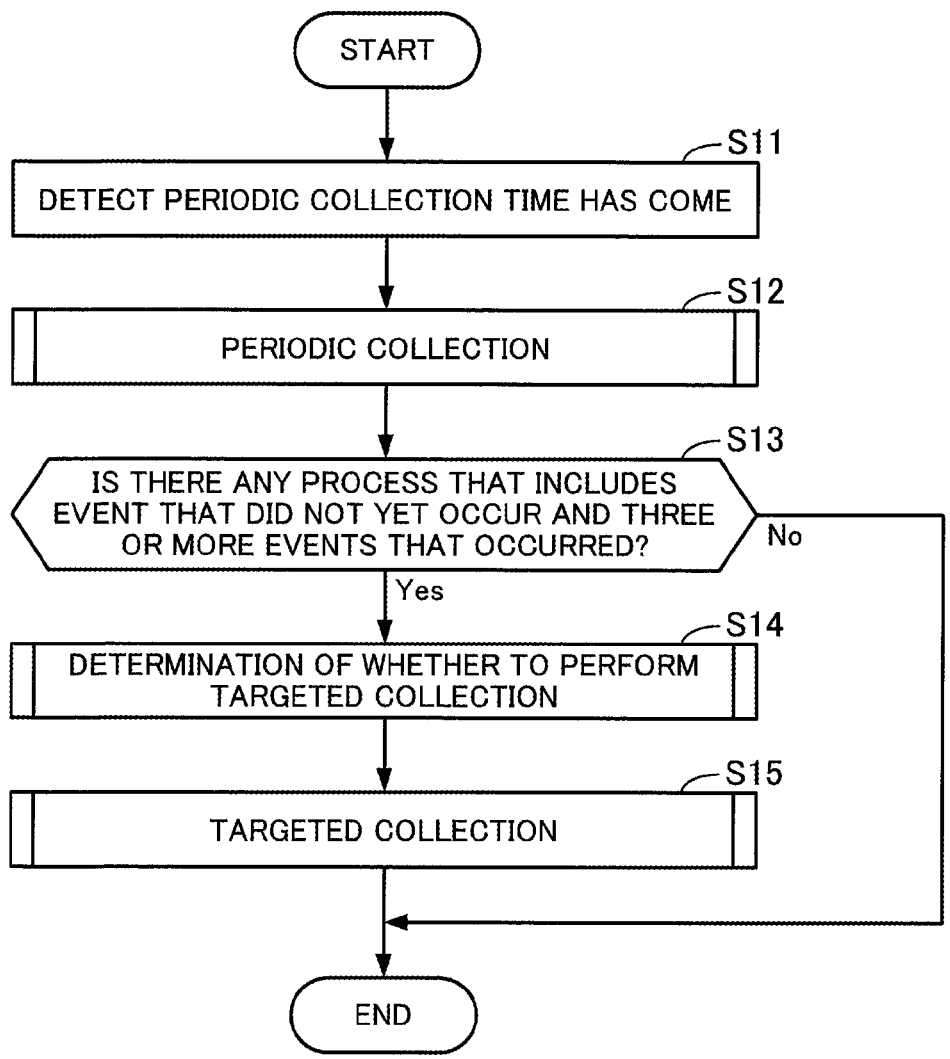
FIG. 18 is a flowchart illustrating an example of log collection.

FIG. 18 is a flowchart illustrating an example of log collection. The procedure of FIG. 18 will be described below step by step.

(S11) The analysis unit 130 detects that a periodic collection time has come. The schedule information for the periodic collection is previously stored in the storage unit 110.

(S12) The analysis unit 130 performs a log collection process (periodic collection) for collecting logs from the business server 200. The analysis unit 130 creates a workflow (process) based on the collected logs and carries out analysis for portions that need to be improved in the operation.

(S13) The analysis unit 130 determines whether or not there is any process that includes any event that did not yet occur and three or more events that occurred, among the processes recognized through the periodic collection. If there is such a process, the procedure proceeds to step S14. Otherwise, the procedure is completed (waiting until the next periodic collection time).

(S14) The analysis unit 130 makes a determination of whether to perform targeted collection or not. A process that includes any event that did not yet occur and three or more events that occurred at the periodic collection time is taken as a candidate process for the targeted collection. The analysis unit 130 determines that, from among the candidate processes, processes satisfying prescribed conditions as processes that are targeted for the targeted collection, and schedules the targeted collection for each of the processes.

(S15) The analysis unit 130 performs the targeted collection for each process in accordance with the schedule. The analysis unit 130 also gives a warning to a user depending on the result of the targeted collection.

Figure 19:
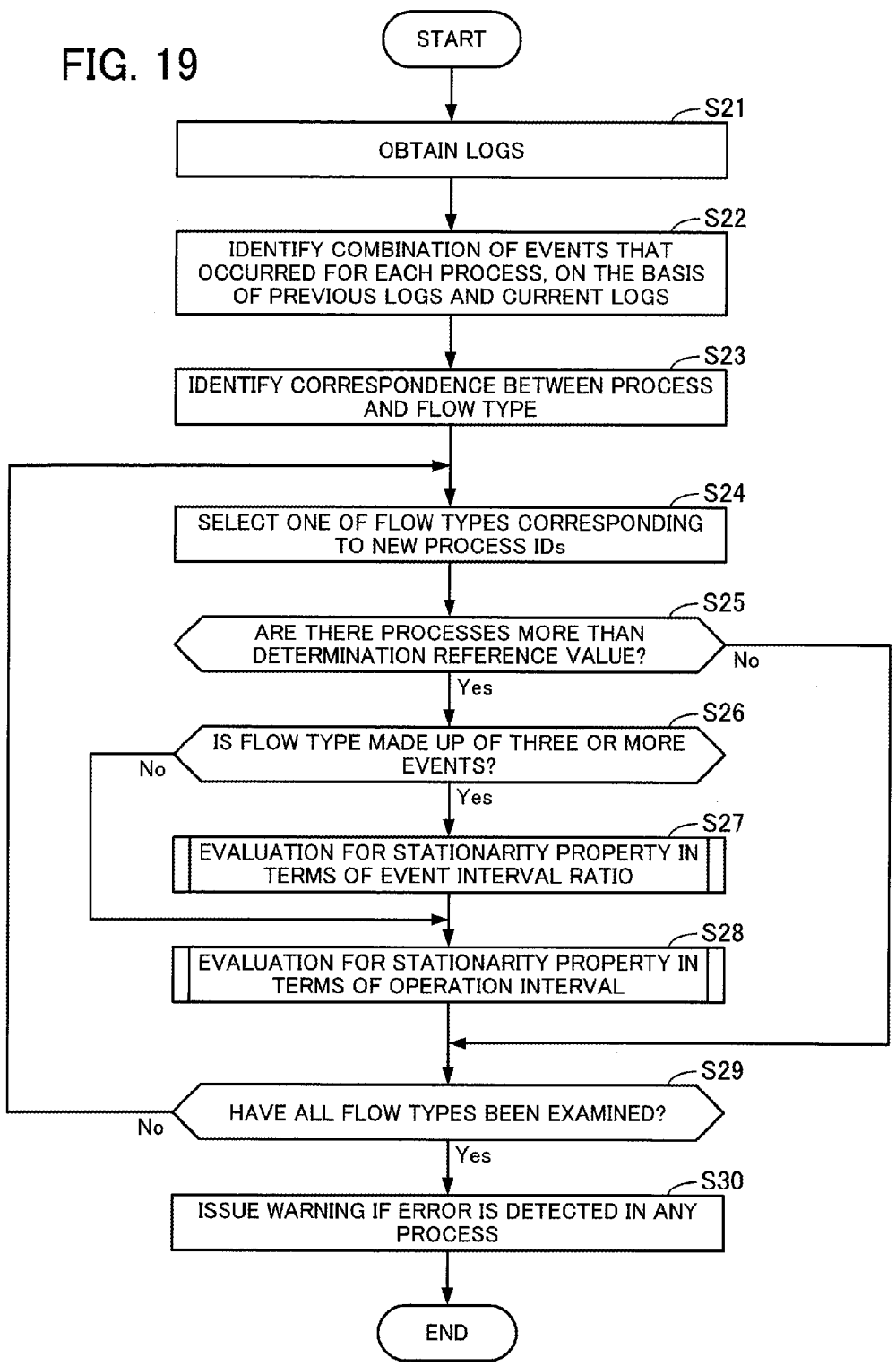
FIG. 19 is a flowchart illustrating an example of a periodic collection process.

FIG. 19 is a flowchart illustrating an example of a periodic collection process. The procedure of FIG. 19 will be described below step by step. The following procedure corresponds to step S12 of FIG. 18.

(S21) The analysis unit 130 obtains logs from the business server 200 and registers the logs in the log table 111. For example, the obtained logs include logs indicating that the events "E11", "E12", and "E13" of the process "101" occurred. At this time, the analysis unit 130 collects logs that have not previously been obtained.

(S22) The analysis unit 130 identifies a combination of events that occurred for each process, on the basis of the previously obtained logs and the currently obtained logs. For example, the currently obtained logs include the logs of the events "E11", "E12", and "E13" of the process "101". Therefore, the analysis unit 130 recognizes that the events "E11", "E12", and "E13" occurred in the process "101". In addition, among the processes recognized from the previously obtained logs, there may be a process whose event did not yet occur at the previous periodic collection time. If the event that did not yet occur is recognized from the currently obtained logs, the log of the recognized event is added to complement the process. In this way, the analysis unit 130 creates the process (workflow) on the basis of the collected logs.

(S23) The analysis unit 130 identifies and registers a correspondence between a process and a flow type in the process management table 114. More specifically, the analysis unit 130 recognizes the events that occurred in each process, in time series on the basis of the IDs (process IDs) and event names registered in the log table 111. The analysis unit 130 translates the event name to an event ID with reference to the event table 112, and obtains a flow type ID corresponding to the event ID with reference to the flow type table 113. In the second embodiment, a flow type ID is detected based on one event ID. Alternatively, a flow type ID may be detected based on the time series of a plurality of event IDs. In this way, it is possible to identify a flow type ID, and to associate the flow type ID with an ID (process ID) registered in the log table 111. For example, the analysis unit 130 associates the flow type ID "F1" with the process ID "101", and then registers this correspondence in the process management table 114.

(S24) The analysis unit 130 selects one of flow type IDs corresponding to the process IDs of processes whose events all occurred among the processes each including a combination of events identified at step S23.

(S25) The analysis unit 130 obtains a determination reference value for the selected flow type ID with reference to the reference parameter table 115. The analysis unit 130 determines with respect to the flow type whether the number of processes (whose events all occurred) is greater than or equal to the determination reference value or not, with reference to the process management table 114. If the number of processes whose events all occurred is greater than or equal to the determination reference value, the procedure proceeds to step S26. Otherwise, the procedure proceeds to step S29. By this judgment, analysis of an insufficient number of samples for a flow type is omitted, which improves the efficiency of the analysis.

(S26) The analysis unit 130 determines whether the selected flow type is made up of three or more events or not. If the selected flow type is made up of three or more events, the procedure proceeds to step S27. If the flow type is made up of two or less events, on the other hand, the procedure proceeds to step S28. This judgment is made with reference to the flow type table 113.

(S27) The analysis unit 130 evaluates whether the selected flow type has a stationarity property in terms of event interval ratio or not. This step will be described in detail later.

(S28) The analysis unit 130 evaluates whether the selected flow type has a stationarity property in terms of operation interval or not. This step will be described in detail later.

(S29) The analysis unit 130 determines whether all of the flow types for which new process IDs are registered have been examined or not. If all of the flow types have been examined, the procedure proceeds to step S30. If any flow type remains, the procedure proceeds back to step S24.

(S30) The analysis unit 130 instructs the output unit 140 to issue a warning indicating an error if the error has occurred in any process configured based on the collected logs. For example, if the occurrence times of some events in a process violate the stationarity property of the flow type of the process, the analysis unit 130 takes it as an error, and instructs the output unit 140 to issue a warning indicating that the activities corresponding to the events was not regularly executed.

Figure 20:
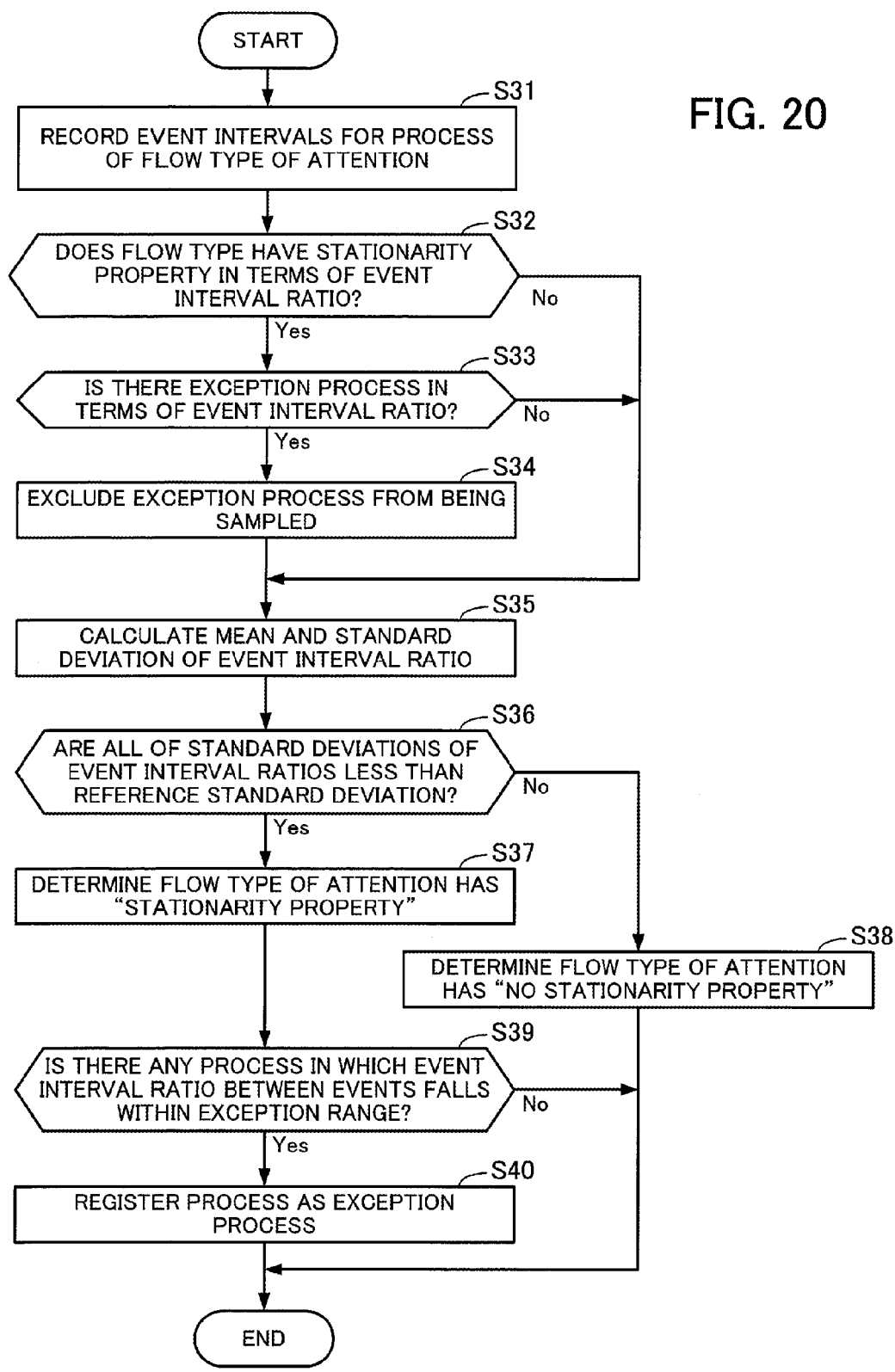
FIG. 20 is a flowchart illustrating an example of stationarity property evaluation in terms of event interval ratio.

FIG. 20 is a flowchart illustrating an example of stationarity property evaluation in terms of event interval ratio. The procedure of FIG. 20 will now be described step by step. The following procedure corresponds to step S27 of FIG. 19. The following procedure is performed on a flow type (the flow type of attention) selected at step S24 of FIG. 19.

(S31) The analysis unit 130 records event intervals for each process of the flow type of attention in the event interval management table 116. More specifically, the timestamp of each event is recorded in the log table 111. The analysis unit 130 obtains a difference in timestamp between events in accordance with the time series of the events of each process recognized at step S23 of FIG. 19, as an event interval between the events.

(S32) The analysis unit 130 determines with reference to the event interval ratio evaluation table 117 whether the flow type of attention is evaluated to have a stationarity property in terms of event interval ratio. If the flow type of attention is evaluated to have a stationarity property in terms of event interval ratio, the procedure proceeds to step S33. Otherwise (no stationarity property), the procedure proceeds to step S35.

(S33) The analysis unit 130 determines with reference to the exception process table 120 whether or not there is any process that is registered as an exception process in terms of event interval ratio among the processes of the flow type of attention. If there is such an exception process, the procedure proceeds to step S34. Otherwise, the procedure proceeds to step S35. For example, the process "O31" of the flow type "F1" is registered in the exception process table 120. The record of the process "O31" indicates "exception in terms of event interval ratio". Therefore, the analysis unit 130 determines that the flow type "F1" has an exception process.

(S34) The analysis unit 130 excludes, among the processes of the flow type of attention, processes registered as exception processes in terms of event interval ratio in the exception process table 120, from being sampled for statistical processing. For example, with respect to the flow type "F1", the analysis unit 130 calculates the mean and the standard deviation of event interval ratio, excluding the process "O31" from being sampled.

(S35) The analysis unit 130 calculates the mean and the standard deviation of event interval ratio with respect to the flow type of attention. More specifically, for each process to be sampled, the analysis unit 130 calculates, with reference to the event interval management table 116, the event interval ratio of each interval between events to a total time taken to perform the process. In this connection, as described earlier, processes whose events all occurred are to be sampled. Then, the analysis unit 130 calculates the mean (m1) of event interval ratios for each interval between events. In addition, the analysis unit 130 calculates the standard deviation ($\sigma$1) that indicates a variation in each event interval ratio. In addition, a range greater than or equal to m1+2$\sigma$ and less than or equal to m1−2$\sigma$1 is calculated as an exception range. The analysis unit 130 registers the number of samples used for the calculation (sample count), the mean m1, the standard deviation $\sigma$1, and the exception range in association with the flow type in the event interval ratio evaluation table 117.

(S36) The analysis unit 130 determines whether all of the standard deviations of event interval ratios are less than a reference standard deviation or not. If all of the standard deviations of event interval ratios are less than the reference standard deviation, the procedure proceeds to step S37. If any of the standard deviations of event interval ratios is greater than or equal to the reference standard deviation, the procedure proceeds to step S38. For example, the event interval ratio evaluation table 117 indicates that the standard deviations of event interval ratios with respect to the flow type "F1" are "0.01", "0.02", and "0.01". The reference parameter table 115 indicates that the reference standard deviation of event interval ratio for the flow type "F1" is "0.03". In this case, the analysis unit 130 determines that all of the standard deviations of event interval ratios with respect to the flow type "F1" are less than the reference standard deviation.

(S37) The analysis unit 130 determines that the flow type of attention has a "stationarity property". The analysis unit 130 then registers this result indicating "stationarity property exists" in association with the flow type in the event interval ratio evaluation table 117.

(S38) The analysis unit 130 determines that the flow type of attention has "no stationarity property". The analysis unit 130 then registers this result indicating "stationarity property does not exist" in association with the flow type in the event interval ratio evaluation table 117. Then, the procedure is completed.

(S39) The analysis unit 130 determines with respect to the flow type of attention whether there is any process in which an event interval ratio between events falls within the exception range or not. If there is such a process, the procedure proceeds to step S40. If there is no such a process, then the procedure is completed. For example, the event interval management table 116 indicates that, in the process "O31", the event intervals #1, #2, and #3 have somewhat different values from the event intervals of the other processes, and the event interval ratios are also greatly different from the event interval ratios of the other processes. For example, the event interval ratio of the interval #2 of the process "O31" is calculated as 21/(7+21+22)=0.42≥0.3892. Therefore, the event interval ratio of the process "O31" is determined to fall within the exception range.

(S40) The analysis unit 130 registers the process in which any event interval ratio falls within the exception range, as an exception process in terms of event interval ratio in the exception process table 120.

In this connection, at step S35, it is possible to simplify the calculation of the mean and the standard deviation taking into account event intervals of newly added processes, using the previously obtained mean of event interval ratios and the sum of squares of the event interval ratios. For example, the sum of squares of event interval ratios may be stored for each event interval in the event interval ratio evaluation table 117. Thereby, with respect to an event interval between events, the current mean is calculated as "current mean={(previous sample count×previous mean)+sum of currently added event interval ratios}/(previous sample count+currently added sample count)". In addition, the current sum of squares is calculated as "current sum of squares=previous sum of squares+sum of squares of currently added event interval ratios".

Therefore, considering "previous sample count+currently added sample count=current sample count", the square of current standard deviation is calculated as "(square of current standard deviation)=(current sum of squares/current sample count)−(square of current mean)".

Figure 21:
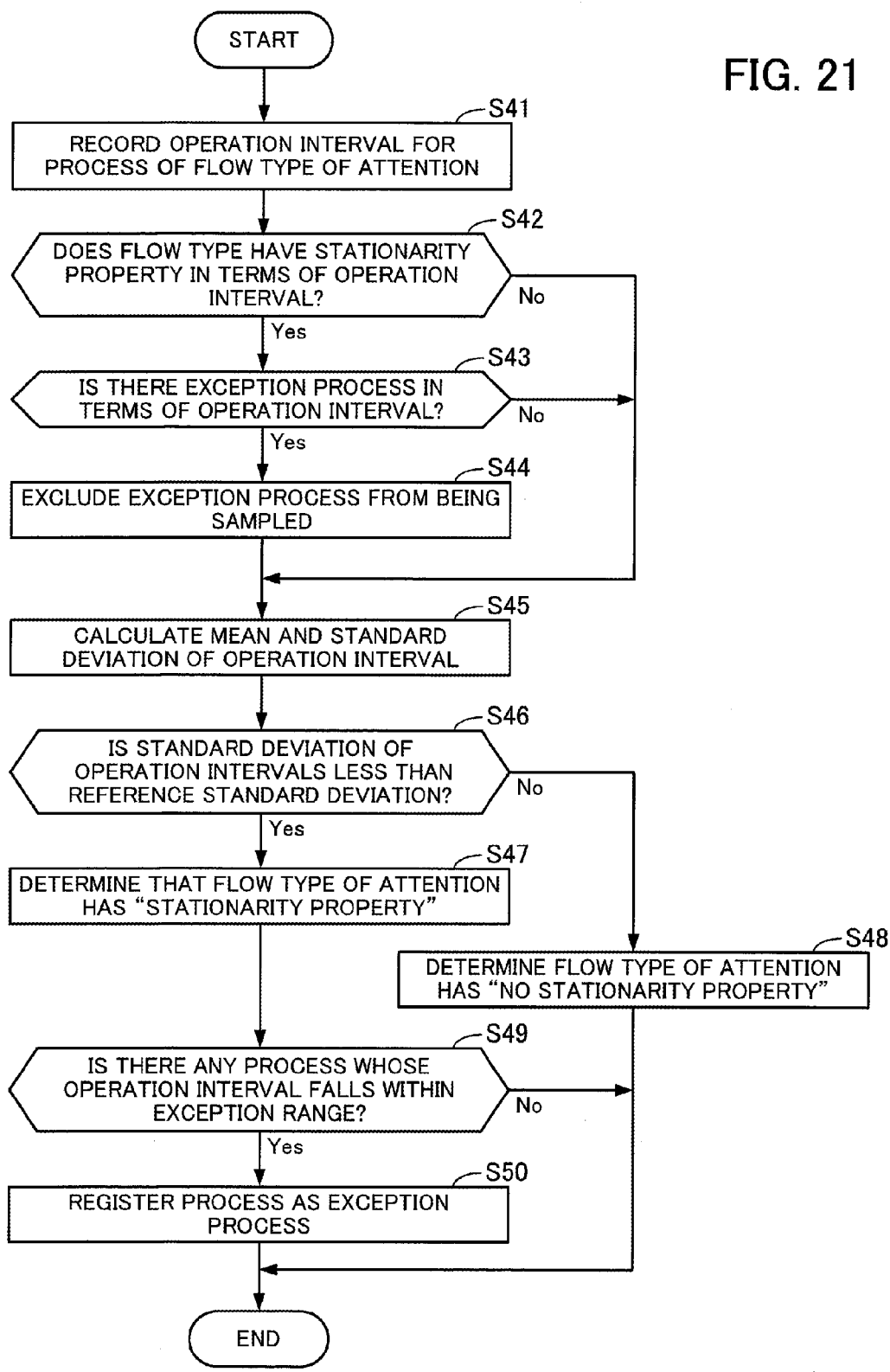
FIG. 21 is a flowchart illustrating an example of stationarity property evaluation in terms of operation interval.

FIG. 21 is a flowchart illustrating an example of stationarity property evaluation in terms of operation interval. The procedure of FIG. 21 will now be described step by step. The following procedure corresponds to step S28 of FIG. 19. The following procedure is performed on a flow type (the flow type of attention) selected at step S24 of FIG. 19.

(S41) The analysis unit 130 records an operation interval for each process of the flow type of attention in the operation interval management table 118. More specifically, the timestamp of each event is registered in the log table 111. The analysis unit 130 obtains a difference in timestamp of the first event, for each process recognized at step S23 of FIG. 19, as the operation interval.

(S42) The analysis unit 130 determines with reference to the operation interval evaluation table 119 whether the flow type of attention is evaluated to have a stationarity property in terms of operation interval or not. If the flow type of attention is evaluated to have a stationarity property in terms of operation interval, the procedure proceeds to step S43. Otherwise (no stationarity property), the procedure proceeds to step S45.

(S43) The analysis unit 130 determines with reference to an exception process table 120 whether or not three is any process that is registered as an exception process in terms of operation interval, among the processes of the flow type of attention. If there is such an exception process, the procedure proceeds to step S44. If there is no exception process, the procedure proceeds to step S45. For example, the process "031" of the flow type "F1" is registered in the exception process table 120. The record of the process "031" indicates an exception in terms of event interval ratio, but does not indicate "an exception in terms of operation interval". Therefore, the analysis unit 130 determines that the flow type "F1" has no exception process.

(S44) The analysis unit 130 excludes, among the processes of the flow type of attention, processes registered as exception processes in terms of operation interval in the exception process table 120, from being sampled for statistical processing.

(S45) The analysis unit 130 calculates the mean and the standard deviation of operation interval with respect to the flow type of attention. The analysis unit 130 extracts processes to be sampled from the operation interval management table 118. As described earlier, processes whose events all occurred are to be sampled. The analysis unit 130 calculates the mean (m2) of the operation intervals of the sampled processes. In addition, the analysis unit 130 calculates the standard deviation (σ2) that indicates a variation in the operation intervals. In addition, a range greater than or equal to m2+2σ2 and less than or equal to m2−2σ2 is calculated as an exception range. The analysis unit 130 registers the number of samples used for the calculation (sample count), the mean m2, the standard deviation σ2, and the exception range in association with the flow type in the operation interval evaluation table 119.

(S46) The analysis unit 130 determines whether the standard deviation of operation interval is less than a reference standard deviation or not. If the standard deviation of operation interval is less than the reference standard deviation, the procedure proceeds to step S47. If the standard deviation of operation interval is greater than or equal to the reference standard deviation, the procedure proceeds to step S48. For example, the operation interval evaluation table 119 indicates that the standard deviation of operation interval of the flow type "F1" is "1 h". The reference parameter table 115 indicates that the reference standard deviation of operation interval for the flow type "F1" is "2.5". In this case, the analysis unit 130 determines that the standard deviation of operation interval with respect to the flow type "F1" is less than the reference standard deviation.

(S47) The analysis unit 130 determines that the flow type of attention has a "stationarity property". The analysis unit 130 then registers this result indicating "stationarity property exists" in association with the flow type in the operation interval evaluation table 119.

(S48) The analysis unit 130 determines that the flow type of attention has "no stationarity property". The analysis unit 130 then registers this result indicating "stationarity property does not exist" in association with the flow type in the operation interval evaluation table 119. Then, the procedure is completed.

(S49) The analysis unit 130 determines with respect to the flow type of attention whether or not there is any process whose operation interval falls within the exception range. If there is such a process, the procedure proceeds to step S50. If there is no such a process, then the procedure is completed. For example, the operation interval management table 118 indicates that the operation interval of "27 h" of the process "031" falls within the exception range "27 h or greater" for the flow type "F1". Therefore, the operation interval of the process "031" is determined to fall within the exception range.

(S50) The analysis unit 130 registers the process whose operation interval falls within the exception range, as an exception process in terms of operation interval in the exception process table 120.

In this connection, the mean and the standard deviation of operation interval are calculated at step S45 in the same way as the above-described mean and the standard deviation of event interval ratio. A sum of squares of operation intervals may be registered for each flow type in the operation interval evaluation table 119.

In addition, in evaluating the stationarity property in terms of operation interval, incomplete processes, which include events that did not yet occur, are excluded from being sampled. However, an operation interval regarding an incomplete process may be obtained if the first event has occurred. Therefore, such an incomplete process may also be used as a sample in evaluating the operation interval.

Figure 22:
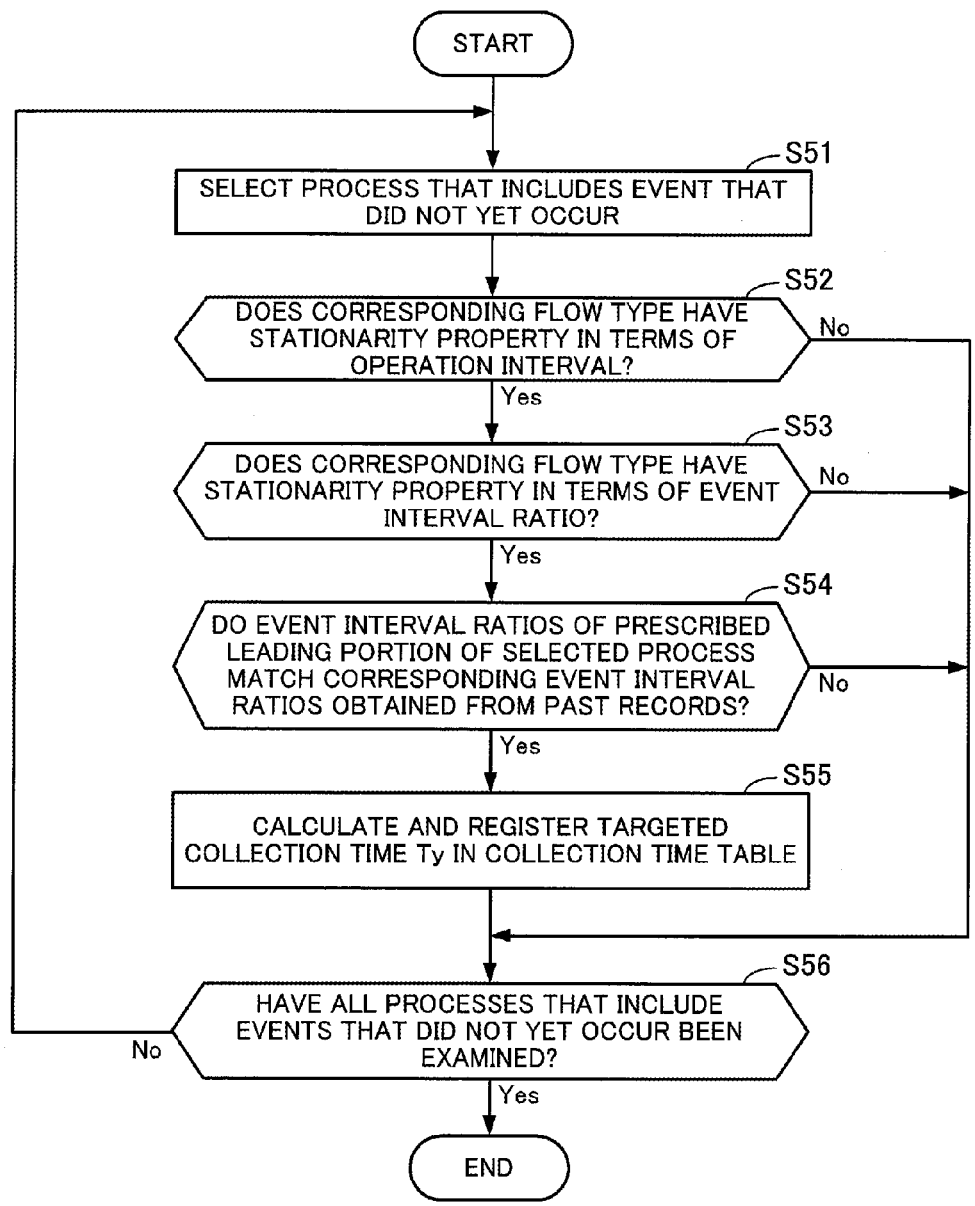
FIG. 22 is a flowchart illustrating an example of determining whether to perform targeted collection.

FIG. 22 is a flowchart illustrating an example of determining whether to perform targeted collection. The procedure of FIG. 22 will now be described step by step. The following procedure corresponds to step S14 of FIG. 18.

(S51) The analysis unit 130 selects a process that includes an event that did not yet occur and three or more events that occurred. For example, the process "101" includes the event "E14" that did not yet occur and the events "E11", "E12", and "E13" that occurred. Therefore, the process "101" is one of selections at step S51.

(S52) The analysis unit 130 determines with reference to the operation interval evaluation table 119 whether the flow type corresponding to the selected process has a stationarity property in terms of operation interval or not. If a stationarity property exists, the procedure proceeds to step S53. Otherwise (no stationarity property), the procedure proceeds to step S56.

(S53) The analysis unit 130 determines with reference to the event interval ratio evaluation table 117 whether the flow type corresponding to the selected process has a stationarity property in terms of event interval ratio or not. If a stationarity property exists, the procedure proceeds to step S54. Otherwise (no stationarity property), the procedure proceeds to step S56.

(S54) The analysis unit 130 determines whether the event interval ratios of a prescribed leading portion of the selected process match the corresponding event interval ratios obtained from the past records or not. If the event interval ratios of the prescribed leading portion of the selected process match the corresponding event interval ratios obtained from the past records, the procedure proceeds to step S55. Otherwise, the procedure proceeds to step S56. For example, the first to third events in a process are specified in advance as the prescribed leading portion. In this case, with respect to the example of the process "101", it is determined whether the event interval ratios between the events "E11" to "E13" match the event interval ratios (intervals #1 and #2) obtained from the past records with a predetermined tolerance (for example, a tolerance of about 10%) or not. As the prescribed leading portion, events up to a third or a subsequent event may be specified.

(S55) The analysis unit 130 calculates a targeted collection time $Ty=\tau+2\sigma$ for the selected process, and registers this time in the collection time table 121. For example, in order to collect a log regarding the event "E14" for the process "101" through targeted collection, the analysis unit 130 calculates the above using $\sigma1$ registered for the interval #3 in the event interval ratio evaluation table 117. The time Ty is calculated as described with reference to FIG. 17. With respect to the process "101" registered in the event interval management table 116, $2\sigma$ is calculated to be about 7 minutes. The analysis unit 130 also calculates and registers a limit time $\tau-2\sigma$ in the collection time table 121.

(S56) The analysis unit 130 determines whether all of processes that include events that did not yet occur have been examined or not. If all of the processes have been examined, the procedure is completed. If any process remains, the procedure proceeds back to step S51.

As described above, a process whose flow type has a stationarity property in terms of both operation interval and event interval ratio and in which the event interval ratios of the prescribed leading portion of events that occurred match the corresponding event interval ratios obtained from the past records is targeted for the targeted collection. This makes it possible to determine processes having a relatively higher stationarity property as processes targeted for the targeted collection.

In this connection, one or both of judgments at steps S52 and S54 may be skipped and a judgment of whether to perform targeted collection may be made. For example, the judgment of step S54 may be skipped in order to include a process in which the first and second events occurred and the third and subsequent events did not yet occur, as a process targeted for the targeted collection. If the judgment of step S54 is skipped, the analysis unit 130 determines "whether or not there is any process that includes any event that did not yet occur and "two" or more events that occurred" at step S13 of FIG. 18. Furthermore, in this case, "a process that includes an event that did not yet occur and two or more events that occurred is selected" at step S51.

Figure 23:
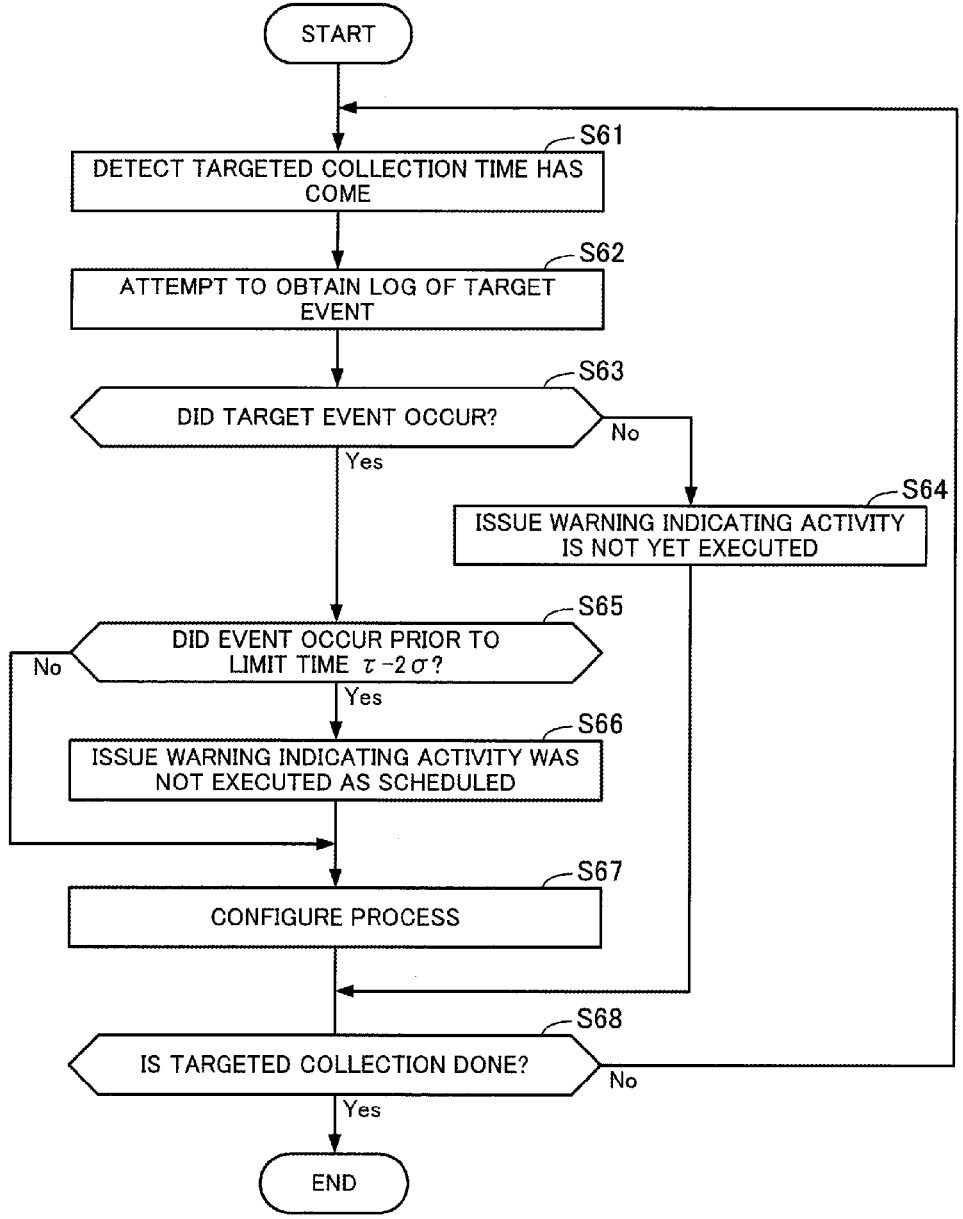
FIG. 23 is a flowchart illustrating an example of a targeted collection process.

FIG. 23 is a flowchart illustrating an example of a targeted collection process. The procedure of FIG. 23 will now be described step by step. The following procedure corresponds to step S15 of FIG. 18.

(S61) The analysis unit 130 detects that a targeted collection time registered in the collection time table 121 has come.

(S62) The analysis unit 130 makes an attempt to obtain the log regarding an event targeted for the targeted collection. For example, the analysis unit 130 may instruct the business server 200 to provide the target log by specifying a process ID and an event name. Alternatively, the analysis unit 130 may search the logs of operations that were registered in the log table 111 by the present time in order to detect the log for the target event.

(S63) The analysis unit 130 determines based on the result of the attempt made at step S62 whether the target event occurred or not. If the target event occurred, the procedure proceeds to step S65. Otherwise, the procedure proceeds to step S64. The obtaining of the log of the target event means that the target event occurred. A failure to obtain such a log means that the target event did not yet occur.

(S64) The analysis unit 130 instructs the output unit 140 to issue an alert. The output unit 140 issues a warning indicating that the activity relating to the event targeted for the targeted collection is not yet executed. For example, the output unit 140 may display the warning details on the display 11. The output unit 140 may send an email describing the warning details to a predetermined electronic email address. The output unit 140 may be designed to send a message indicating the warning details to a prescribed terminal device which then displays the message.

(S65) The analysis unit 130 determines with reference to the timestamp of the log obtained through the targeted collection whether the event occurred prior to the limit time $\tau-2\sigma$ or not. If the event occurred prior to the limit time, the procedure proceeds to step S66. Otherwise, the procedure proceeds to step S67.

(S66) The analysis unit 130 instructs the output unit 140 to issue an alert. The output unit 140 issues a warning indicating that the activity relating to the event targeted for targeted collection was executed too early (not executed as scheduled). The warning is issued in the same way as step S64.

(S67) The analysis unit 130 complements an incomplete process with the log of the event obtained through the targeted collection (the process is configured). For example, the analysis unit 130 fills in the value of an event interval that is not registered in the event interval management table 116. In addition, the analysis unit 130 is able to complement a workflow diagram to be provided for the user.

(S68) The analysis unit 130 determines whether the targeted collection is done for all processes registered in the collection time table 121 or not. If the targeted collection is done, then the procedure is completed. Otherwise, the procedure proceeds to step S61 when the next targeted collection time comes.

FIGS. 24A and 24B illustrate specific examples of targeted collection. FIG. 24A exemplifies the case where in the process "101", the event "E14" that did not yet occur is detected through targeted collection. FIG. 24B exemplifies the case where in the process "101", the event "E14" that did not yet occur is not detected through targeted collection.

In the example of the process "101", the time τ estimated based on the mean of past event interval ratios is 3 hours and 6 minutes (=(0.4920/0.1588)×1 hour) after the occurrence time of the event "E13". Since the occurrence time of the event "E13" is 13:00, the time τ is estimated to be 16:06. In addition, the standard deviation of the event interval ratio between the events "E13" and "E14", σ1=0.01, is converted to time (minutes), thereby obtaining σ=(1/0.1588)×0.01×60 minutes=3.778 minutes. Therefore, 2σ is calculated to be about 7 minutes.

Therefore, the targeted collection time Ty=τ+2σ for the event "E14" is calculated to be 16:13. In addition, the limit time τ−2σ is calculated to be 15:59. By detecting the occurrence of the event "E14" through the log collection made at the time Ty, the analysis unit 130 is able to immediately complement the process "101" in which the logs of the other events were obtained through the periodic collection, with the log of the event "E14" (see the example of FIG. 24A).

On the other hand, if the analysis unit 130 fails to detect the occurrence of the event "E14" at the time Ty, the analysis unit 130 causes the output unit 140 to issue a warning indicating the routine operation has yet to be executed (see the example of FIG. 24B). In this connection, as described earlier, if it is detected that the event "E14" recognized through the log collection at the time Ty occurred prior to the limit time 15:59, the analysis unit 130 also causes the output unit 140 to issue a warning indicating that the process violates the stationarity property of the operation.

Figure 25:
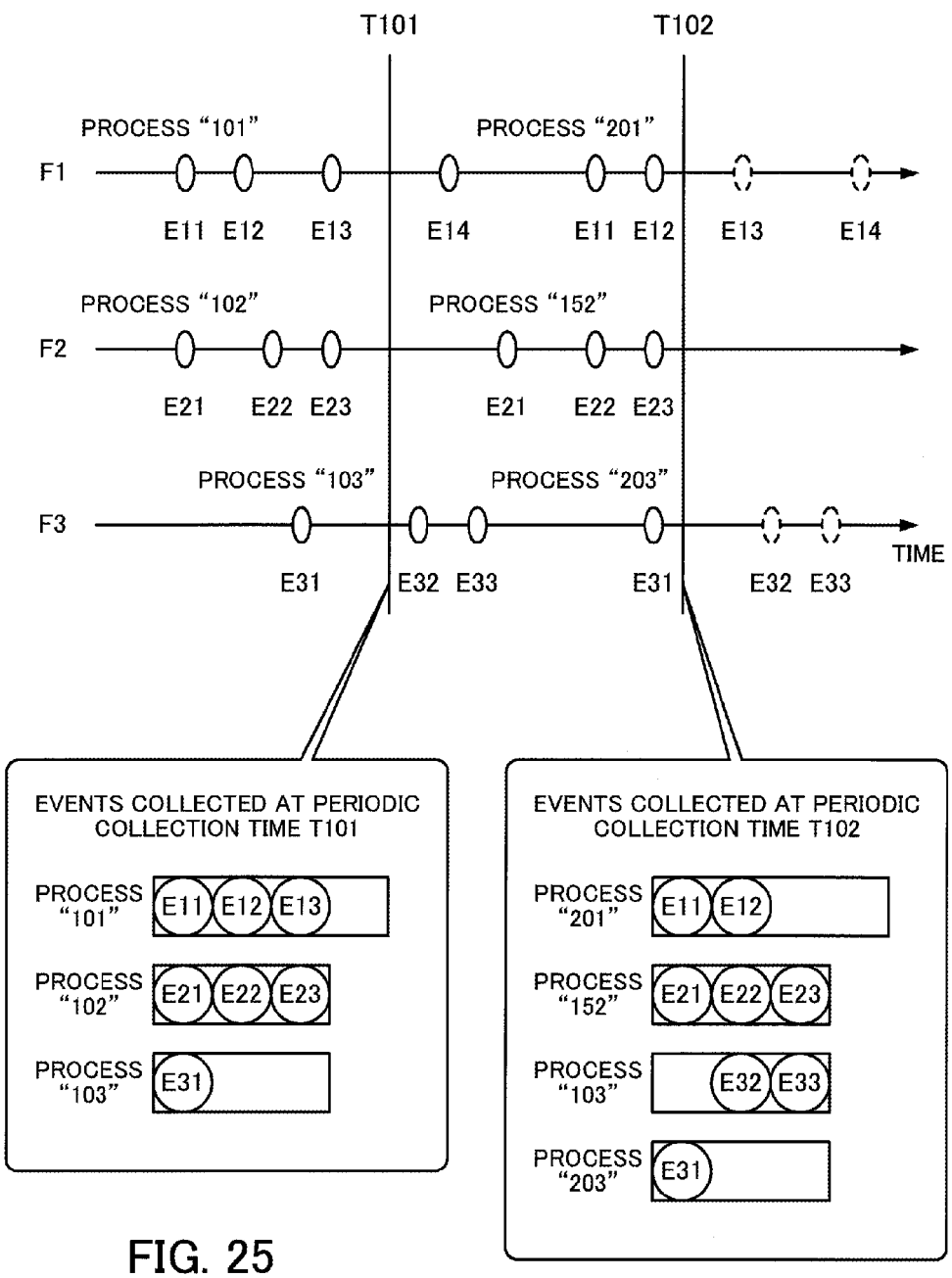
FIG. 25 illustrates an example of periodic collection for a plurality of processes.

FIG. 25 illustrates an example of periodic collection for a plurality of processes. In the information processing system of the second embodiment, the business server 200 performs a plurality of business processes. Therefore, the processes (workflows) of a plurality of flow types are performed in parallel. Therefore, there is a low likelihood that all events of the processes are complete at a periodic collection time.

For example, assuming that processes of flow types "F1", "F2", and "F3" are performed in parallel, the occurrences of events may be detected as follows for the processes by obtaining logs output from the business server 200 at a periodic collection time T101.

The monitoring server 100 detects that events "E11", "E12", and "E13" occurred in a process "101" of flow type "F1". The monitoring server 100 also detects that events "E21", "E22", and "E23" occurred in a process "102" of flow type "F2". The monitoring server 100 further detects that an event "E31" occurred in a process "103" of flow type "F3".

In this case, at the time T101, an event "E14" of the process "101" did not yet occur, all events of the process "102" occurred, and events "E32" and "E33" of the process "103" did not yet occur.

Therefore, in the case where the processes "101" and "103" satisfy prescribed conditions, the monitoring server 100 collects the logs of the events that did not yet occur, through targeted collection. In the example of the second embodiment, the event "E14" of the process "101" is targeted for the targeted collection. Therefore, it is possible to confirm the execution status of the process "101" prior to the next periodic collection time T102. That is, it is possible to promptly confirm the execution status of the process "101". In addition, it is also possible to promptly issue a warning depending on the execution status of the process "101".

On the other hand, the events "E32" and "E33" of the process "103" are not targeted for the targeted collection because there is only one event "E31" that occurred in the process "103". Therefore, the logs of the remaining events "E32" and "E33" of the process "103" are collected at the next periodic collection time T102. In this connection, in the judgment at step S54 of FIG. 22, the process of the flow type "F3" is not determined to be a process target for targeted collection (this is because the judgment of step S54 is made for a process made up of four or more events). On the other hand, as described earlier, the judgment of step S54 of FIG. 22 may be skipped. In this case, the log of the event "E33" is collected through the targeted collection if the events "E31" and "E32" already occurred at a periodic collection time.

At the periodic collection time T102, the occurrences of the events of each process are obtained with reference to logs output from the business server 200 in the same way as described above. For example, the monitoring server 100 detects that the events "E11" and "E12" occurred in a process "201" of the flow type "F1". The monitoring server 100 also detects that the events "E21", "E22", and "E23" occurred in a process "152" of the flow type "F2". The monitoring server 100 further detects that the events "E32" and "E33" occurred in the process "103" of the flow type "F3". The monitoring server 100 further detects that the event "E31" occurred in a process "203" of the flow type "F3".

After the periodic collection time T102, the monitoring server 100 is able to collect the logs of the events "E13" and "E14" of the process "201" through the targeted collection in the same way (in the case where no judgment is made at step S54 of FIG. 22).

As described above, the monitoring server 100 is able to efficiently obtain the execution status of tasks. Now consider the case where logs output from the business server 200 are collected periodically in order to analyze the logs and confirm the execution status of a workflow. In this case, however, all logs of the events included in the workflow may not be collected at a periodic collection time, as explained earlier. This may cause a failure in creating a workflow and thereby cause a delay in analyzing the operation.

To deal with this, an approach of setting a short interval for periodic collection may be considered. However, an increase in the frequency of log collection and analysis increases the workload of the monitoring server 100. Alternatively, another approach of continuously monitoring logs for events that did not yet occur after a periodic collection time may be considered. However, this approach also increases the workload of the monitoring server 100 due to the continuous log monitoring.

To deal with the above, the monitoring server 100 obtains the execution status of an event that did not yet occur at a periodic collection time, at the time estimated based on past records. This makes it possible to confirm the execution status of the event that did not yet occur prior to the next periodic collection time. Therefore, if an error, such as non-execution of an activity relating to the event that did not yet occur, is detected, it is possible to issue a warning to a user early. This prevents a risk of such an activity remaining unexecuted until the next periodic collection.

In addition, the execution status of only target events is obtained through the targeted collection, and the event, the process, or the flow type of attention is analyzed at a targeted collection time. This remarkably reduces the workload of the monitoring server 100 for the analysis process, compared with the case of analyzing other operations together.

Especially, a process is configured without dividing a series of events that occurred, which improves the accuracy in judging the stationarity property of an operation. In addition, in the targeted collection, if a target event does not yet occur at about an estimated time, or if the target event does not occur in an allowable time range, it is possible to issue a warning indicating that there is a process violating the stationarity property before the next periodic collection time comes.

As described above, while suppressing an increase in the load for detecting the occurrences of events that did not yet occur, it is possible to confirm the occurrences of the events that did not yet occur promptly when the events occur. That is, it is possible to efficiently confirm the execution status of the tasks of events that are not completed. As a result, it is possible to promptly analyze operations violating stationarity properties among operations that are routinely performed, recognize bottleneck activities, and promote improvement in the operations.

In this connection, the information processing of the first embodiment is realized by the operating unit 1b executing a program. The information processing of the second embodiment is realized by the processor 101 executing a program. The program is recorded on a computer-readable recording medium (for example, the optical disc 13, the memory device 14, the memory card 16, or the like).

For example, to distribute the program, recording media on which the program is recorded are distributed. Alternatively, the program may be stored in another computer and may be transferred through a network. A computer stores (installs) the program recorded on a recording medium or transferred from the other computer, for example, in a storage device, such as the RAM 102, the HDD 103, or the like. Then, the computer reads the program from the storage device and runs the program.

According to one aspect, it is possible to efficiently confirm the execution status of tasks.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   obtaining first information indicating an execution status of a plurality of tasks related to each other;
   estimating an estimated time by which an unexecuted task included in the plurality of tasks is completed based on second information indicating past execution records of the plurality of tasks, the unexecuted task being not yet executed when the first information is obtained; and
   obtaining an execution status of the unexecuted task at the estimated time;
   wherein the plurality of tasks are three or more events that are executed in a sequence of an operation; and
   wherein the process further includes evaluating whether first time intervals between events belonging to the operation have a stationarity property or not based on the second information, obtaining second time intervals between execution times of two or more executed events based on the first information when the first time intervals have the stationarity property, and estimating the estimated time based on the second time intervals and means of ratios of the first time intervals.

2. The non-transitory computer-readable storage medium according to claim 1, wherein the estimated time is a time at which the unexecuted task is estimated to be completed.

3. The non-transitory computer-readable storage medium according to claim 1, wherein the execution status of only the unexecuted task is obtained at the estimated time.

4. The non-transitory computer-readable storage medium according to claim 1, wherein the process further includes issuing a warning when detecting that the unexecuted task is not yet executed at the estimated time.

5. The non-transitory computer-readable storage medium according to claim 1, wherein the estimated time is after a time at which the unexecuted task is estimated to be completed.

6. The non-transitory computer-readable storage medium according to claim 1, wherein the process further includes determining whether to perform the obtaining of the execution status based on the ratios of the first time intervals.

7. The non-transitory computer-readable storage medium according to claim 1, wherein:
   the plurality of tasks are four or more events that are executed in the sequence of the operation; and
   the process further includes obtaining ratios of the second time intervals between execution times of three or more executed events based on the first information when the first time intervals have the stationarity property, and determining whether to perform the obtaining of the execution status based on the ratios of the second time intervals and the means of the ratios of the first time intervals.

8. The non-transitory computer-readable storage medium according to claim 1, wherein the process further includes determining whether to perform the obtaining of the execution status based on time intervals between a plurality of execution times of a first event of the three or more events.

9. The non-transitory computer-readable storage medium according to claim 1, wherein the first information is obtained at one of a plurality of times that are periodic.

10. An information acquisition method comprising:
   obtaining, by a processor, first information indicating an execution status of a plurality of tasks related to each other;
   estimating, by the processor, an estimated time by which an unexecuted task included in the plurality of tasks is completed based on second information indicating past execution records of the plurality of tasks, the unexecuted task being not yet executed when the first information is obtained; and
   obtaining, by the processor, an execution status of the unexecuted task at the estimated time;
   wherein the plurality of tasks are three or more events that are executed in a sequence of an operation; and
   wherein the estimating further includes evaluating whether first time intervals between events belonging to the operation have a stationarity property or not based on the second information, obtaining second time intervals between execution times of two or more executed events based on the first information when the first time intervals have the stationarity property, and estimating the estimated time based on the second time intervals and means of ratios of the first time intervals.

11. An information acquisition apparatus comprising:
a memory configured to store first information indicating past execution records of a plurality of tasks related to each other; and
a processor configured to perform a process including:
  obtaining second information indicating an execution status of the plurality of tasks;
  estimating an estimated time by which an unexecuted task included in the plurality of tasks is completed based on the first information, the unexecuted task being not yet executed when the first information is obtained; and
  obtaining an execution status of the unexecuted task at the estimated time;
wherein the plurality of tasks are three or more events that are executed in a sequence of an operation; and
wherein the process further includes evaluating whether first time intervals between events belonging to the operation have a stationarity property or not based on the second information, obtaining second time intervals between execution times of two or more executed events based on the first information when the first time intervals have the stationarity property, and estimating the estimated time based on the second time intervals and means of ratios of the first time intervals.

* * * * *